(12) United States Patent
Tanaka et al.

(10) Patent No.: US 12,022,193 B2
(45) Date of Patent: Jun. 25, 2024

(54) IMAGING APPARATUS AND OPERATION METHOD THEREOF

(71) Applicant: FUJIFILM Corporation, Tokyo (JP)

(72) Inventors: Koichi Tanaka, Saitama (JP); Tomoyuki Kawai, Saitama (JP); Junya Kitagawa, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/153,353

(22) Filed: Jan. 12, 2023

(65) Prior Publication Data

US 2023/0171494 A1     Jun. 1, 2023

Related U.S. Application Data

(63) Continuation of application No. PCT/JP2021/024465, filed on Jun. 29, 2021.

(30) Foreign Application Priority Data

Jul. 31, 2020    (JP) ................................ 2020-130630

(51) Int. Cl.
     *H04N 23/68*      (2023.01)
     *H04N 23/667*      (2023.01)

(52) U.S. Cl.
    CPC ......... *H04N 23/683* (2023.01); *H04N 23/667* (2023.01); *H04N 23/6812* (2023.01); *H04N 23/687* (2023.01)

(58) Field of Classification Search
None
See application file for complete search history.

(56) References Cited

U.S. PATENT DOCUMENTS 5,867,213 A     2/1999    Ouchi
7,830,416 B2 *   11/2010   Tanaka ................... H04N 23/75
                                                348/208.99

(Continued)

FOREIGN PATENT DOCUMENTS

JP        H07123317       5/1995
JP        2006310971      11/2006

(Continued)

OTHER PUBLICATIONS

"International Search Report (Form PCT/ISA/210) of PCT/JP2021/024465," dated Sep. 21, 2021, with English translation thereof, pp. 1-5.

(Continued)

*Primary Examiner* — Cynthia Segura
(74) *Attorney, Agent, or Firm* — JCIPRNET

(57) ABSTRACT

The imaging apparatus includes an imaging sensor, a detection sensor that detects rotational shake in the roll direction, a mechanical vibration-proof mechanism that corrects rotational shake, and a processor. The processor is configured to execute: mechanical vibration-proof processing using the mechanical vibration-proof mechanism; electronic vibration-proof processing of correcting the rotational shake; driving processing of driving the imaging sensor in one mode selected from a plurality of modes including a first mode in which a motion picture is captured at a first frame rate and a second mode in which a motion picture is captured at a second frame rate; and correction distribution processing of distributing correction of a part of the rotational shake to the mechanical vibration-proof processing and correction of a part of the rotational shake to the electronic vibration-proof processing.

15 Claims, 20 Drawing Sheets

(56) References Cited

U.S. PATENT DOCUMENTS

| | | | |
|---|---|---|---|
| 11,228,711 B2* | 1/2022 | Masuda | H04N 23/687 |
| 2009/0225176 A1* | 9/2009 | Honjo | G03B 5/02 |
| | | | 348/E5.022 |
| 2012/0293672 A1* | 11/2012 | Nonaka | H04N 23/68 |
| | | | 348/208.5 |
| 2012/0293674 A1 | 11/2012 | Uenaka | |
| 2013/0155262 A1* | 6/2013 | Katoh | H04N 23/683 |
| | | | 348/208.5 |
| 2015/0085149 A1* | 3/2015 | Tsubaki | H04N 23/6812 |
| | | | 348/208.4 |
| 2019/0052810 A1* | 2/2019 | Tsubaki | H04N 23/6812 |
| 2019/0199930 A1 | 6/2019 | Noguchi | |
| 2019/0331875 A1 | 10/2019 | Ikeda | |
| 2021/0281758 A1* | 9/2021 | Masuda | G03B 15/00 |
| 2022/0303470 A1* | 9/2022 | Karibe | H04N 23/687 |
| 2023/0314832 A1* | 10/2023 | Shikama | G03B 13/36 |
| | | | 359/554 |

FOREIGN PATENT DOCUMENTS

| | | |
|---|---|---|
| JP | 2012123065 | 6/2012 |
| JP | 2012242563 | 12/2012 |
| JP | 2015033020 | 2/2015 |
| JP | 2015118147 | 6/2015 |
| JP | 2019117977 | 7/2019 |
| JP | 2019191515 | 10/2019 |

OTHER PUBLICATIONS

"Written Opinion of the International Searching Authority (Form PCT/ISA/237) of PCT/JP2021/024465," dated Sep. 21, 2021, with English translation thereof, pp. 1-6.

"Office Action of Japan Counterpart Application", dated May 9, 2023, with English translation thereof, p. 1-p. 5.

Office Action of Japan Counterpart Application, with English translation thereof, dated Jul. 4, 2023, pp. 1-6.

* cited by examiner

| FR (fps) | $\alpha_1$ | $f_{C1}$ (Hz) | $\alpha_2$ | $f_{C2}$ (Hz) |
|---|---|---|---|---|
| 60 | 0.8 | 30 | 0.9 | 30 |
| 120 | 0.4 | 60 | 0.45 | 60 |
| 240 | 0.2 | 120 | 0.23 | 120 |
| ... | ... | ... | ... | ... |

| FR (fps) | $\alpha_1$ | $f_{C1}$ (Hz) | $\alpha_2$ | $f_{C2}$ (Hz) | D (mm) |
|---|---|---|---|---|---|
| 60 | 0.8 | 30 | 0.9 | 30 | 36 |
| 120 | 0.4 | 60 | 0.45 | 60 | 38 |
| 240 | 0.2 | 120 | 0.23 | 120 | 40 |
| ... | ... | ... | ... | ... | ... |

IMAGING APPARATUS AND OPERATION METHOD THEREOF

CROSS-REFERENCE TO RELATED APPLICATIONS

This application is a continuation application of International Application No. PCT/JP2021/024465 filed Jun. 29, 2021 the disclosure of which is incorporated herein by reference in its entirety. Further, this application claims priorities from Japanese Patent Application No. 2020-130630, filed Jul. 31, 2020, the disclosure of which is incorporated herein by reference in their entirety.

TECHNICAL FIELD

The technique of the present disclosure relates to an imaging apparatus and an operation method thereof.

RELATED ART

JP2012-242563A describes a camera shake correction device comprising: a roll angle detection unit that detects a roll angle; a rotational shake correction unit that calculates rotational shake on the basis of the roll angle and correct the rotational shake by rotating an imaging sensor; a translational shake detection unit that detects translational shake; and a translational shake correction unit that cuts out a region subjected to translational shake correction from two images captured by an imaging sensor under the rotational shake correction.

JP2019-117977A describes a vibration-proof control device that acquires information on a shutter speed relating to an imaging performed in the imaging apparatus and controls the first correction unit and the second correction unit using different correction methods such that the first correction unit and the second correction unit correct the shake generated in the imaging apparatus. The vibration-proof control device makes assignment of the vibration correction to the first correction unit and the second correction unit different depending on the shutter speed at which the information is acquired.

JP2015-118147A describes an imaging apparatus that captures an image by an exposure method in which an exposure timing is different for each pixel line. The imaging apparatus comprises: a first correction unit that electronically corrects image blur on the basis of a shake signal indicating shake of the apparatus; and an RS distortion correction control unit that corrects distortion occurring in images captured at exposure timings different for each pixel line on the basis of the shake signal. The imaging apparatus determines a state where the apparatus is supported, on the basis of the shake signal. Then, in a case where it is determined that the apparatus is fixedly supported, the imaging apparatus enlarges a movable range of correction using the RS distortion correction control unit.

SUMMARY

According to an embodiment relating to the technique of the present disclosure, there are provided an imaging apparatus capable of appropriately performing electronic vibration-proof even in a case where a frame rate is high, and an operation method thereof.

In order to achieve the above-mentioned object, the imaging apparatus according to an aspect of the present disclosure comprises: an imaging sensor; a detection sensor that detects rotational shake, which is delivered to a body that accommodates the imaging sensor, in a roll direction; a mechanical vibration-proof mechanism that corrects the rotational shake by rotatably holding the imaging sensor in the roll direction and rotating the imaging sensor; and a processor. The processor is configured to execute: mechanical vibration-proof processing using the mechanical vibration-proof mechanism; electronic vibration-proof processing of correcting the rotational shake; driving processing of driving the imaging sensor in one mode selected from a plurality of modes including a first mode in which a motion picture is captured at a first frame rate and a second mode in which a motion picture is captured at a second frame rate different from the first frame rate; and correction distribution processing of distributing correction of a part of the rotational shake to the mechanical vibration-proof processing and correction of a part of the rotational shake to the electronic vibration-proof processing. In the correction distribution processing, the processor causes a correction distribution ratio between the mechanical vibration-proof processing and the electronic vibration-proof processing to be different in the first mode and the second mode.

It is preferable that the second frame rate is higher than the first frame rate, and in the correction distribution processing, the processor causes a correction distribution ratio of the electronic vibration-proof processing in the second mode to be smaller than a correction distribution ratio of the electronic vibration-proof processing in the first mode.

It is preferable that the processor sets the correction distribution ratio of the electronic vibration-proof processing in the second mode to 0.

It is preferable that the processor is configured to: separate the rotational shake into a first frequency component and a second frequency component having a frequency higher than a frequency of the first frequency component; distribute correction of a first component, which is obtained by multiplying the first frequency component by a coefficient α ($0<α<1$) corresponding to the correction distribution ratio of the electronic vibration-proof processing, by the electronic vibration-proof processing, in the first mode; and distribute a second component, which is obtained by adding a component obtained by multiplying the first frequency component by ($1-α$) to the second frequency component, by the mechanical vibration-proof processing.

It is preferable that the processor is configured to: determine the correction distribution ratio by acquiring the coefficient α, which corresponds to a frame rate in the mode in which the imaging sensor is driven, with reference to a look-up table in which a relationship between the frame rate and the coefficient α is recorded.

It is preferable that the coefficient α is different depending on a resolution of an image signal.

It is preferable that a lens is mountable on the body, and the coefficient α is different depending on presence or absence of an optical shake correction function of the lens mounted on the body or a zoom magnification.

It is preferable that the processor is configured to: change a recording region, which is selected from an inside of an imaging region of the imaging sensor between a plurality of frames, in the electronic vibration-proof processing; and cause the recording region in the second mode to be larger than the recording region in the first mode.

It is preferable that the mechanical vibration-proof mechanism holds the imaging sensor such that the imaging sensor is translatable in an intersection direction intersecting a rotation axis in the roll direction, the detection sensor detects translational shake, which is delivered to the body, in the intersection direction. It is preferable that the processor is configured to: correct the rotational shake and the translational shake by rotating and translating the imaging sensor, in the mechanical vibration-proof processing; correct the rotational shake and the translational shake, in the electronic vibration-proof processing; and distribute correction of a part of the rotational shake to the mechanical vibration-proof processing and distribute correction of a part of the rotational shake to the electronic vibration-proof processing, and distribute correction of a part of the translational shake to the mechanical vibration-proof processing and distribute correction of a part of the translational shake to the electronic vibration-proof processing, in the correction distribution processing.

It is preferable that the detection sensor detects at least one angular shake around an axis intersecting the rotation axis in addition to the rotational shake and the translational shake, and in the correction distribution processing, in a case where a shake obtained by adding the angular shake to the translational shake is set as a total shake, the processor distributes correction of a part of the total shake to the mechanical vibration-proof processing and distributes correction of a part of the total shake to the electronic vibration-proof processing.

It is preferable that in the first mode or the second mode, the correction distribution ratio of the translational shake is different from the correction distribution ratio of the rotational shake.

It is preferable that the processor is configured to: execute a third mode in which the motion picture of the first frame rate is generated by synthesizing a plurality of frames imaged at the second frame rate, in the driving processing; and correct the translational shake for the plurality of frames imaged at the second frame rate and correct the rotational shake for a synthetic frame in which the plurality of frames are synthesized, in the electronic vibration-proof processing.

It is preferable that the processor is configured to: switch to the second mode on the basis of an instruction from a user during motion picture imaging in the first mode, in the driving processing; and set the correction distribution ratio for the rotational shake of the electronic vibration-proof processing to 0 in a case where the switching to the second mode is performed, in the correction distribution processing.

It is preferable that in the correction distribution processing, the processor determines the correction distribution ratio in live view imaging before motion picture imaging on the basis of a frame rate of the mode executed after the live view imaging.

An operation method of an imaging apparatus according to an aspect of the present disclosure includes an imaging sensor, a detection sensor that detects rotational shake, which is delivered to a body that accommodates the imaging sensor, in a roll direction, and a mechanical vibration-proof mechanism that corrects the rotational shake by rotatably holding the imaging sensor in the roll direction and rotating the imaging sensor. The operation method of the imaging apparatus comprises: executing mechanical vibration-proof processing using the mechanical vibration-proof mechanism; executing electronic vibration-proof processing of correcting the rotational shake; executing driving processing of driving the imaging sensor in one mode selected from a plurality of modes including a first mode in which a motion picture is captured at a first frame rate and a second mode in which a motion picture is captured at a second frame rate higher than the first frame rate; and executing correction distribution processing of distributing correction of a part of the rotational shake to the mechanical vibration-proof processing and distributing correction of a part of the rotational shake to the electronic vibration-proof processing, and correction distribution processing of causing a correction distribution ratio between the mechanical vibration-proof processing and the electronic vibration-proof processing to be different in the first mode and the second mode.

DETAILED DESCRIPTION

An example of an embodiment relating to the technique of the present disclosure will be described with reference to the accompanying drawings.

First, the wording used in the following description will be described.

In the following description, the "IC" is an abbreviation for "Integrated Circuit". The "CPU" is an abbreviation for "Central processing Unit". The "ROM" is an abbreviation for "Read Only Memory". The "RAM" is an abbreviation for "Random Access Memory". The "CMOS" is an abbreviation for "Complementary Metal Oxide Semiconductor".

The "FPGA" is an abbreviation for "Field-Programmable Gate Array". The "PLD" is an abbreviation for "Programmable Logic Device". The "ASIC" is an abbreviation for "Application Specific Integrated Circuit". The "OVF" is an abbreviation for "Optical View Finder". The "EVF" is an abbreviation for "Electronic View Finder". The "JPEG" is an abbreviation for "Joint Photographic Experts Group". The DSP is an abbreviation for "Digital Signal processor".

As used herein, the term "equal" includes not only being exactly equal, but also being substantially equal in the sense that it includes errors that are generally tolerated in the art of the technique of the present disclosure. Further, as used herein, the term "intersecting" includes not only intersecting at an angle of 90°, but also substantially intersecting in the sense that it includes errors that are generally tolerated in the art of the technique of the present disclosure.

(Configuration of Imaging Apparatus)

As a first embodiment of the imaging apparatus, the technique of the present disclosure will be described by using an interchangeable lens digital camera as an example. The technique of the present disclosure is not limited to the interchangeable lens type, and can be applied to a digital camera having a lens integrated therein.

Figure 1:
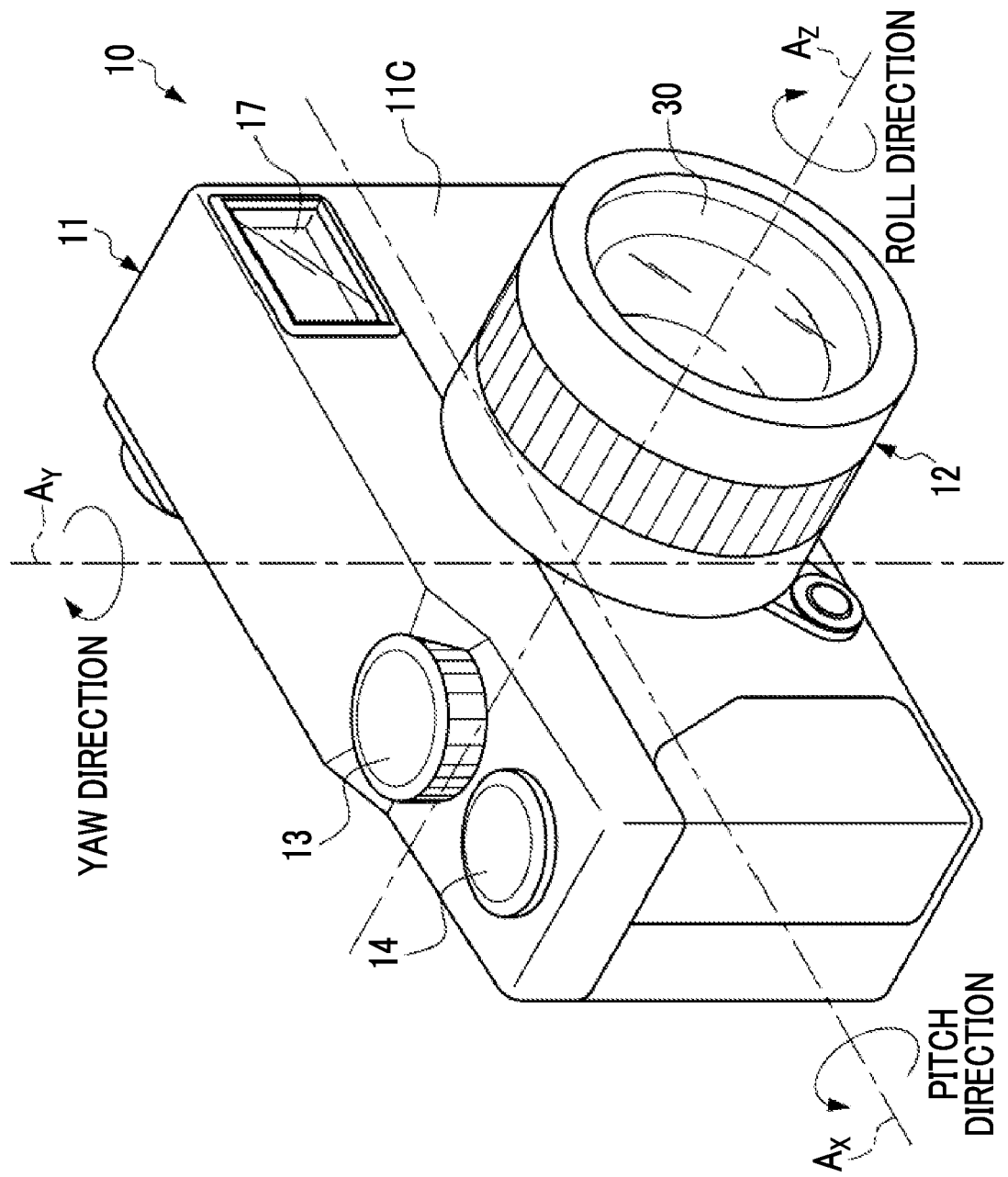
FIG. 1 is a schematic perspective view showing an example of a front side of an imaging apparatus.

FIG. 1 shows an example of the entire surface side of an imaging apparatus 10. As shown in FIG. 1, the imaging apparatus 10 is an interchangeable lens digital camera. The imaging apparatus 10 is composed of a body 11 and an imaging lens 12 which is interchangeably mounted on the body 11. The imaging lens 12 is mounted on the front surface 11C side of the body 11 through the camera side mount 11A and the lens side mount 12A (refer to FIG. 3). The imaging lens 12 is an example of a lens according to the technique of the present disclosure.

A dial 13 and a release button 14 are provided on an upper surface of the body 11. The dial 13 is operated in a case of setting the operation mode or the like. Examples of the operation mode of the imaging apparatus 10 include a still picture imaging mode, a motion picture imaging mode, and an image display mode. The release button 14 is operated by a user at the time of starting execution of the still picture imaging or the motion picture imaging.

The body 11 is provided with a finder 17. Here, the finder 17 is a hybrid finder (registered trademark). The hybrid finder indicates a finder in which, for example, an optical view finder (hereinafter referred to as "OVF") and an electronic view finder (hereinafter referred to as "EVF") are selectively used.

The Z axis $A_Z$ shown in FIG. 1 corresponds to an optical axis of the imaging lens 12. The X axis $A_X$ and the Y axis $A_Y$ are orthogonal to each other and orthogonal to the Z axis $A_Z$. The X axis $A_X$ and the Y axis $A_Y$ correspond to a pitch axis and a yaw axis according to the technique of the present disclosure. In the following description, a direction of rotation around the Z axis $A_Z$ is referred to as a roll direction. Further, a direction of rotation around the X axis $A_X$ is referred to as a pitch direction. Furthermore, a direction of rotation around the Y axis $A_Y$ is referred to as a yaw direction. Further, a direction of the X axis $A_X$ is referred to as the X direction, and a direction of the Y axis $A_Y$ is referred to as the Y direction. The Z axis $A_Z$ is an example of a "rotation axis" according to the technique of the present disclosure. It should be noted that the X direction and the Y direction are examples of the "intersection direction intersecting the rotation axis" according to the technique of the present disclosure.

Figure 2:
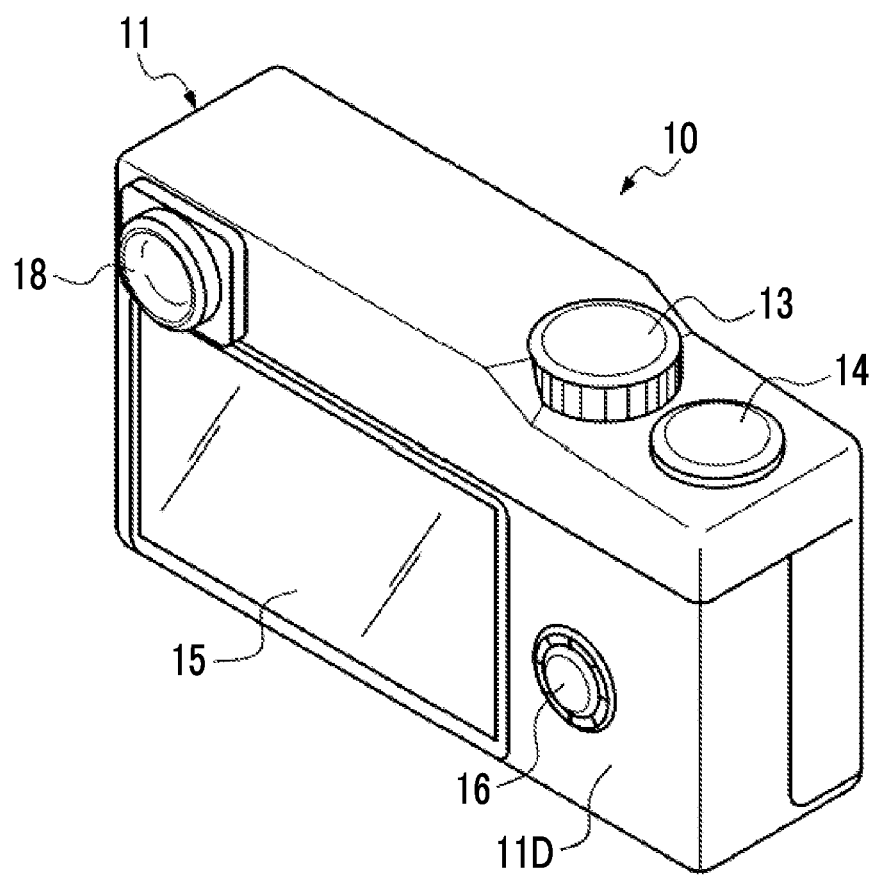
FIG. 2 is a schematic perspective view showing an example of a rear side of the imaging apparatus.

FIG. 2 shows an example of the rear side of the imaging apparatus 10. As shown in FIG. 2, a display 15, an instruction button 16, and a finder eyepiece portion 18 are provided on the rear surface 11D of the body 11. The display 15 displays an image on the basis of an image signal obtained by imaging, various menu screens, and the like.

The instruction button 16 receives various instructions. Here, the "various instructions" include, for example, an instruction to display a menu screen on which various menus can be selected, an instruction to select one or a plurality of menus, an instruction to confirm the selected contents, an instruction to delete the selected contents, and various instructions such as autofocus mode, manual focus mode, and frame advance. Further, the body 11 is provided with a power switch and the like.

An optical image which can be visually recognized by the OVF and a live view image that is an electronic image which can be visually recognized by the EVF are selectively projected on the finder eyepiece portion 18. A user is able to observe an optical image or a live view image of the subject through the finder eyepiece portion 18.

Figure 3:
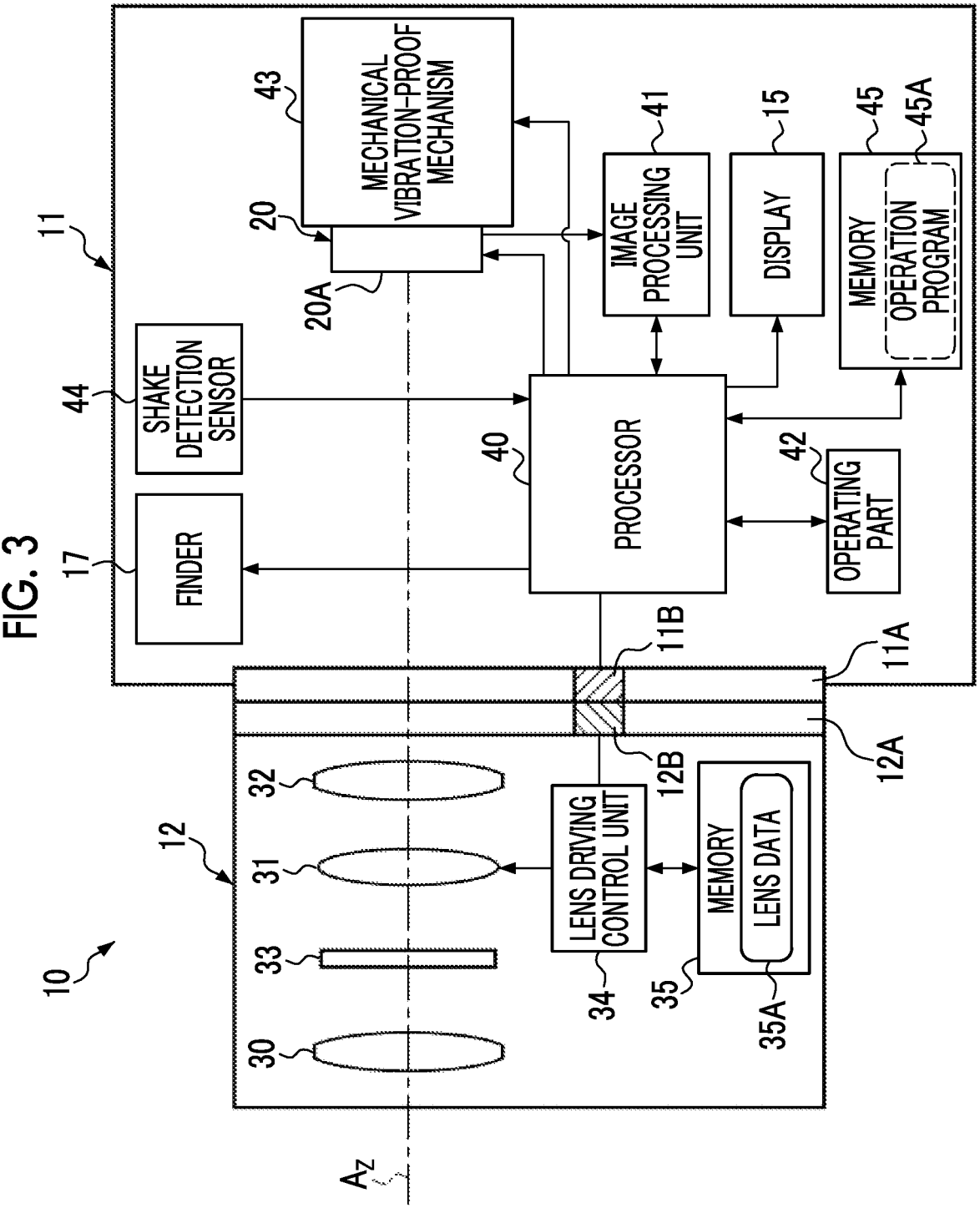
FIG. 3 is a diagram showing an example of an internal configuration of the imaging apparatus.

FIG. 3 shows an example of an internal configuration of the imaging apparatus 10. The body 11 and the imaging lens 12 are electrically connected to each other by bringing an electric contact 11B provided on a camera side mount 11A into contact with an electric contact 12B provided on a lens side mount 12A.

The imaging lens 12 includes an objective lens 30, a focus lens 31, a rear end lens 32, and a stop 33. Each member is disposed in an order of the objective lens 30, the stop 33, the focus lens 31, and the rear end lens 32 from the objective side along the optical axis (that is, the Z axis $A_Z$) of the imaging lens 12. The objective lens 30, the focus lens 31, and the rear end lens 32 constitute the imaging optical system. The type, number, and arrangement order of the lenses constituting the imaging optical system are not limited to the example shown in FIG. 3.

Further, the imaging lens 12 has a lens driving control unit 34 and a memory 35. The lens driving control unit 34 is composed of, for example, a CPU, a RAM, a ROM, or the like. The lens driving control unit 34 is electrically connected to a processor 40 in the body 11 through the electric contact 12B and the electric contact 11B.

The lens driving control unit 34 drives the focus lens 31 and the stop 33 on the basis of a control signal which is transmitted from the processor 40. The lens driving control unit 34 performs driving control of the focus lens 31 on the basis of a control signal for focusing control which is transmitted from the processor 40 in order to adjust a focal position of the imaging lens 12. For example, the processor 40 performs focusing control by a phase difference method.

The stop 33 has an opening in which the opening diameter is variable about the optical axis. The lens driving control unit 34 performs driving control of the stop 33 on the basis of a control signal for stop adjustment which is transmitted from the processor 40 in order to adjust the amount of light incident on a light-receiving surface 20A of the imaging sensor 20.

The memory 35 is a non-volatile memory such as a flash memory. For example, lens data 35A which is for identifying the type of the imaging lens 12 is stored in the memory 35. The lens data 35A includes, for example, information that indicates a focal length (that is, a zoom magnification) of the imaging lens 12.

The body 11 includes an imaging sensor 20, a processor 40, an image processing unit 41, an operating part 42, a mechanical vibration-proof mechanism 43, a shake detection sensor 44, a memory 45, and a display 15. The processor 40 controls operations of the imaging sensor 20, the image processing unit 41, the operating part 42, the mechanical vibration-proof mechanism 43, the shake detection sensor 44, and the display 15. The processor 40 is composed of, for example, a CPU, a RAM, a ROM, or the like. In such a case, the processor 40 executes various kinds of processing on the basis of the operation program 45A stored in the memory 45. The operation program 45A may be recorded and distributed on an external recording medium not shown in the drawing and may be installed by the CPU from the recording medium. Alternatively, the operation program 45A may be stored in a server or the like connected to the network in a state of being accessible from the outside, and may be downloaded, installed, and executed in the RAM or the ROM by the CPU in response to a request. The processor 40 may be composed of an aggregate of a plurality of IC chips.

The imaging sensor 20 is, for example, a CMOS type image sensor. The imaging sensor 20 is disposed such that the Z axis $A_Z$ as the optical axis is orthogonal to the light-receiving surface 20A and the Z axis $A_Z$ is located at the center of the light-receiving surface 20A. Light that has passed through the imaging lens 12 is incident on the light-receiving surface 20A. A plurality of pixels, which generate an image signal by performing photoelectric conversion, are formed on the light-receiving surface 20A. The imaging sensor 20 generates and outputs an image signal by the photoelectric conversion of light incident on each pixel.

Further, the mechanical vibration-proof mechanism 43 holds the imaging sensor 20. The mechanical vibration-proof mechanism 43 holds the imaging sensor 20 translatably in directions of the X axis $A_X$ and Y axis $A_Y$ and rotatably in the roll direction.

The shake detection sensor 44 detects shake which is delivered to the body 11 that accommodates the imaging sensor 20. The shake detection sensor 44 is, for example, a 5-axis shake detection sensor that detects shake in each of the roll direction, the yaw direction, the pitch direction, the X direction, and the Y direction. Hereinafter, the shake in the roll direction is referred to as rotational shake. The shake in the yaw direction and the pitch direction is referred to as angular shake. The shake in the X and Y directions is referred to as translational shake.

Figure 4:
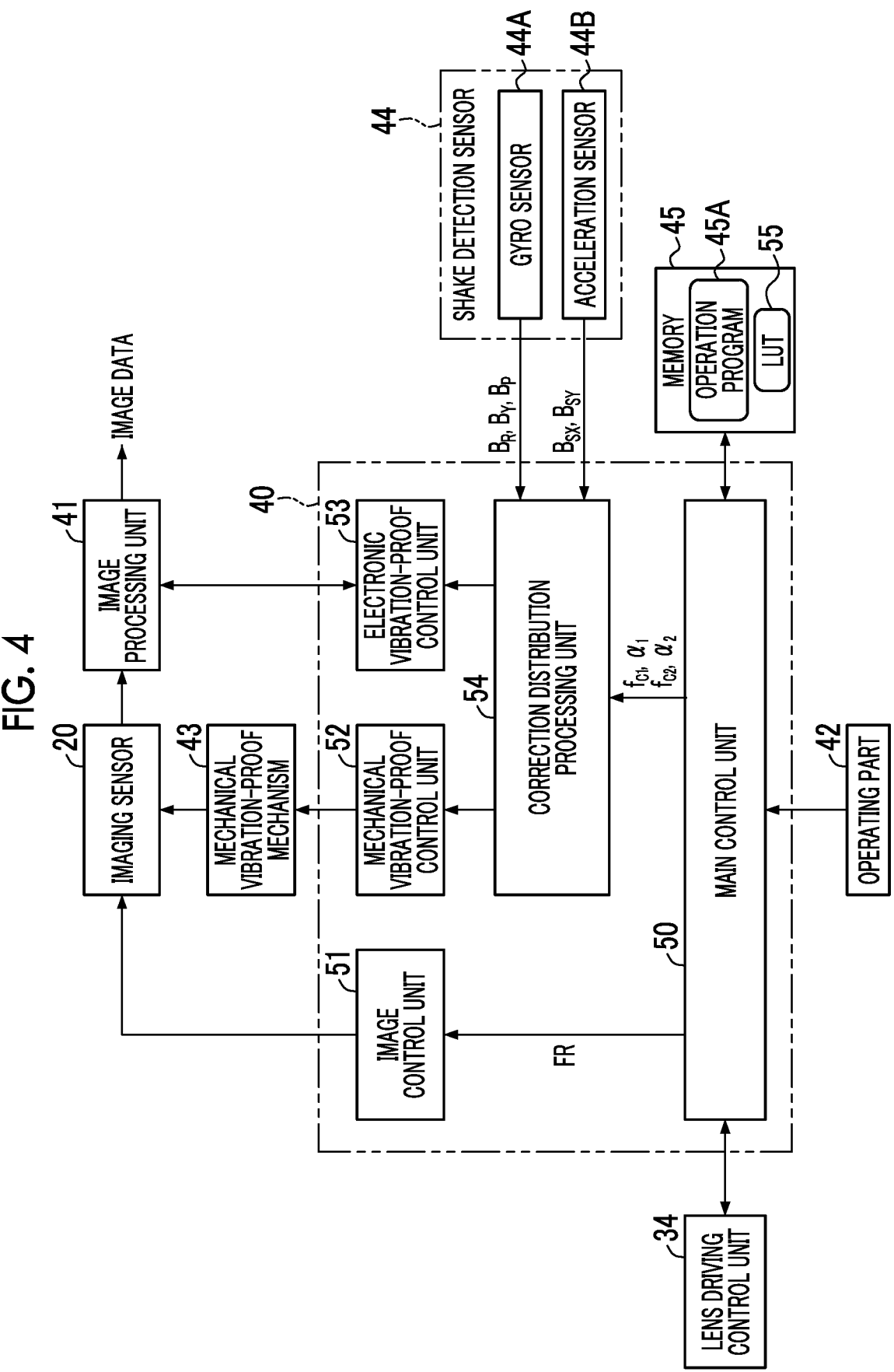
FIG. 4 is a block diagram showing an example of a functional configuration of a processor.

The shake detection sensor 44 is composed of, for example, a gyro sensor 44A and an acceleration sensor 44B (refer to FIG. 4). The gyro sensor 44A detects the rotational shake and the angular shake. The acceleration sensor 44B detects the translational shake. The shake detection sensor 44 is an example of a detection sensor according to the technique of the present disclosure.

The image processing unit 41 is composed of, for example, a DSP. The image processing unit 41 performs various kinds of image processing on the image signal to generate image data in a predetermined file format (for example, JPEG format or the like).

The display 15 displays an image on the basis of the image data which is generated by the image processing unit 41. The image includes a still picture, a motion picture, and a live view image. The live view image is an image that is displayed in real time on the display 15 by sequentially outputting the image data, which is generated by the image processing unit 41, to the display 15.

The image data, which is generated by the image processing unit 41, can be stored in an internal memory (not shown in the drawing) built in the body 11 or a storage medium (for example, the memory card) that can be attached to and detached from the body 11.

The operating part 42 includes the dial 13, the release button 14, and the instruction button 16 (refer to FIGS. 1 and 2) described above. The processor 40 controls each unit in the body 11 and the lens driving control unit 34 in the imaging lens 12 in response to an operation of the operating part 42.

Further, the processor 40 acquires the lens data 35A stored in the memory 35 through the lens driving control unit 34 in a case where the imaging lens 12 is connected to the body 11.

A camera side mount 11A is provided on a front surface 11C of the body 11. The imaging lens 12 is provided with a lens side mount 12A on the rear end side. By mounting the lens side mount 12A on the camera side mount 11A, the imaging lens 12 is connected to the body 11.

In the imaging sensor 20, a light-receiving surface 20A is exposed from an opening of the camera side mount 11A. In a case where the imaging lens 12 is mounted on the body 11, the imaging lens 12 forms an image of light from a subject on the light-receiving surface 20A of the imaging sensor 20. The imaging sensor 20 generates and outputs an image signal by imaging the light of which the image is formed on the light-receiving surface 20A.

FIG. 4 shows an example of a functional configuration of the processor 40. The processor 40 implements various functional units by executing processing in accordance with an operation program 45A stored in the memory 45. As shown in FIG. 4, for example, the processor 40 implements a main control unit 50, an imaging control unit 51, a mechanical vibration-proof control unit 52, an electronic vibration-proof control unit 53, and a correction distribution processing unit 54.

The main control unit 50 comprehensively controls the operation of the imaging sensor 20 on the basis of the instruction signal which is input from the operating part 42. The imaging control unit 51 controls the imaging operation of the imaging sensor 20. The imaging control unit 51 drives the imaging sensor 20 in the still picture imaging mode or the motion picture imaging mode.

The motion picture imaging mode includes a plurality of modes that have different frame rates FR. The plurality of modes include a first mode in which the motion picture is captured at the first frame rate FR1 and a second mode in which the motion picture is captured at the second frame rate FR2 different from the first frame rate FR1. In the present embodiment, the second frame rate FR2 is set to be higher than the first frame rate FR1 (that is, FR2>FR1). For example, FR1=60 fps and FR2=120 fps.

By operating the operating part 42, a user is able to select the still picture imaging mode or the motion picture imaging mode, the frame rate FR in the motion picture imaging mode, and the like. The main control unit 50 supplies the imaging control unit 51 with the frame rate FR selected by the operating part 42. That is, the imaging control unit 51 executes driving processing of driving the imaging sensor 20 in an optional mode selected from the plurality of modes having different frame rate FRs.

The mechanical vibration-proof control unit 52 executes the mechanical vibration-proof processing of correcting a part of the rotational shake and the translational shake by driving the mechanical vibration-proof mechanism 43 on the basis of the instruction issued from the correction distribution processing unit 54.

The electronic vibration-proof control unit 53 executes the electronic vibration-proof processing of correcting a part of the rotational shake and the translational shake by controlling the image processing unit 41 on the basis of an instruction from the correction distribution processing unit 54. The details will be described later, but the electronic vibration-proof processing corrects a part of the rotational shake and the translational shake by changing a recording region, which is for recording an image signal, between frames from the imaging region of the imaging sensor 20. The image processing unit 41 generates image data by performing image processing on a signal corresponding to the recording region among the image signals. The modification example of the recording region includes rotation and translation of the recording region. Therefore, in order to generate the image data, it is necessary to perform arithmetic processing such as projection transformation or affine transformation on the signal included in the recording region, and the processing requires time.

The correction distribution processing unit 54 executes correction distribution processing in which correction of a part of the rotational shake and the translational shake is distributed to the mechanical vibration-proof processing and correction of a part of the rotational shake and the translational shake is distributed to the electronic vibration-proof processing. That is, in the technique of the present disclosure, the mechanical vibration-proof processing and the electronic vibration-proof processing are used in combination to reduce deterioration of image quality due to shake delivered to the body 11.

The gyro sensor 44A is an angular velocity sensor that detects the rotational shake and the angular shake, and outputs an angular velocity signal as a detection value. The gyro sensor 44A outputs an angular velocity signal $B_R$ that indicates rotational shake and angular velocity signals $B_Y$ and $B_P$ that indicate angular shake. The angular velocity signal $B_Y$ indicates the angular shake in the yaw direction. The angular velocity signal $B_P$ indicates the angular shake in the pitch direction.

The acceleration sensor 44B outputs an acceleration signal as a detection value of the translational shake. The acceleration sensor 44B outputs an acceleration signal $B_{SX}$ that indicates the translational shake in the X direction and an acceleration signal $B_{SY}$ that indicates the translational shake in the Y direction.

The angular velocity signals $B_R$, $B_Y$, and $B_P$ which are output from the gyro sensor 44A are input to the correction distribution processing unit 54 through an A/D converter, an amplifier, or the like (not shown in the drawing). The acceleration signals $B_{SX}$ and $B_{SY}$ which are output from the acceleration sensor 44B are input to the correction distribution processing unit 54 through an A/D converter, an amplifier, or the like (not shown in the drawing).

In the present embodiment, the shake detection axes are five axes in the roll direction, the yaw direction, the pitch direction, the X direction, and the Y direction. In contrast, the shake correction axes are three axes in the roll direction, the X direction, and the Y direction. Therefore, in the yaw direction and the pitch direction, the angular shake cannot be directly corrected on the basis of the angular velocity signals $B_Y$ and $B_P$ that indicate the angular shake. In the present embodiment, the angular shake in the yaw direction is included in the translational shake in the X direction and is corrected, and the angular shake in the pitch direction is included in the translational shake in the Y direction and is corrected.

The main control unit 50 causes the correction distribution processing unit 54 to set coefficients $\alpha_1$ and $\alpha_2$ corresponding to the correction distribution ratio of the electronic vibration-proof processing and the separation frequencies $f_{c1}$ and $f_{c2}$ for frequency-separating the rotational shake and the angular shake. The coefficient $\alpha_1$ indicates a correction distribution ratio of the rotational shake in the electronic vibration-proof processing. The coefficient $\alpha_2$ indicates a correction distribution ratio of the translational shake in the electronic vibration-proof processing. The separation frequency $f_{c1}$ is a reference frequency which is for frequency-separating the rotational shake. The separation frequency $f_{c2}$ is a reference frequency which is for frequency-separating the translational shake. Here, the coefficient $\alpha_1$ is a value within a range of $0 \leq \alpha_1 \leq 1$. The coefficient $\alpha_2$ is a value within a range of $0 \leq \alpha_2 \leq 1$. In the first mode in which the frame rate is high, to be described later, $\alpha_1$ is a value within a range of $0 < \alpha_1 < 1$. The coefficient $\alpha_2$ is a value within a range of $0 < \alpha_2 < 1$.

The correction distribution processing unit 54 calculates a first rotation amount, which is for correcting a part of the rotational shake by the electronic vibration-proof processing and a second rotation amount, which is for correcting a part of the rotational shake by the mechanical vibration-proof processing, on the basis of the angular velocity signal $B_R$, the coefficient $\alpha_1$, and the separation frequency $f_{c1}$.

Further, the correction distribution processing unit 54 calculates a first shift amount, which is for correcting a part of the translational shake by the electronic vibration-proof processing, and a second shift amount, which is for correcting a part of the translational shake by the mechanical vibration-proof processing, on the basis of the acceleration signals $B_{SX}$, $B_{SY}$, the angular velocity signals $B_Y$, $B_P$, the coefficient $\alpha_2$, and the separation frequency $f_{c2}$.

The memory 45 stores a look-up table (hereinafter referred to as LUT) 55. The LUT 55 is a table in which a relationship between the frame rate FR, the coefficients $\alpha_1$ and $\alpha_2$, and the separation frequencies $f_{c1}$ and $f_{c2}$ is recorded. The main control unit 50 acquires the coefficients $\alpha_1$ and $\alpha_2$ and the separation frequencies $f_{c1}$ and $f_{c2}$ corresponding to the frame rate FR of the selected mode through the operating part 42 with reference to the LUT 55. The main control unit 50 sets the acquired coefficients $\alpha_1$ and $\alpha_2$ and the separation frequencies $f_{c1}$ and $f_{c2}$ in the correction distribution processing unit 54.

(Structure of Correction Distribution Processing Unit)

Figure 5:
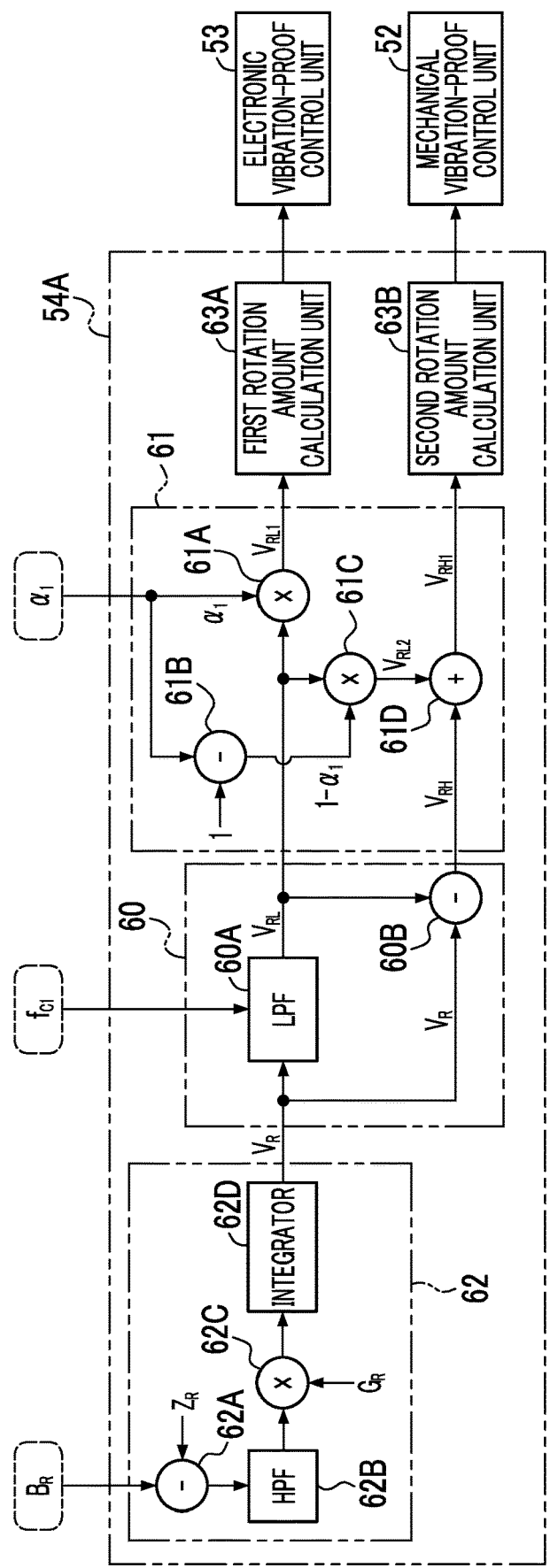
FIG. 5 is a diagram showing an example of a configuration of a first distribution processing unit.
Figure 6:
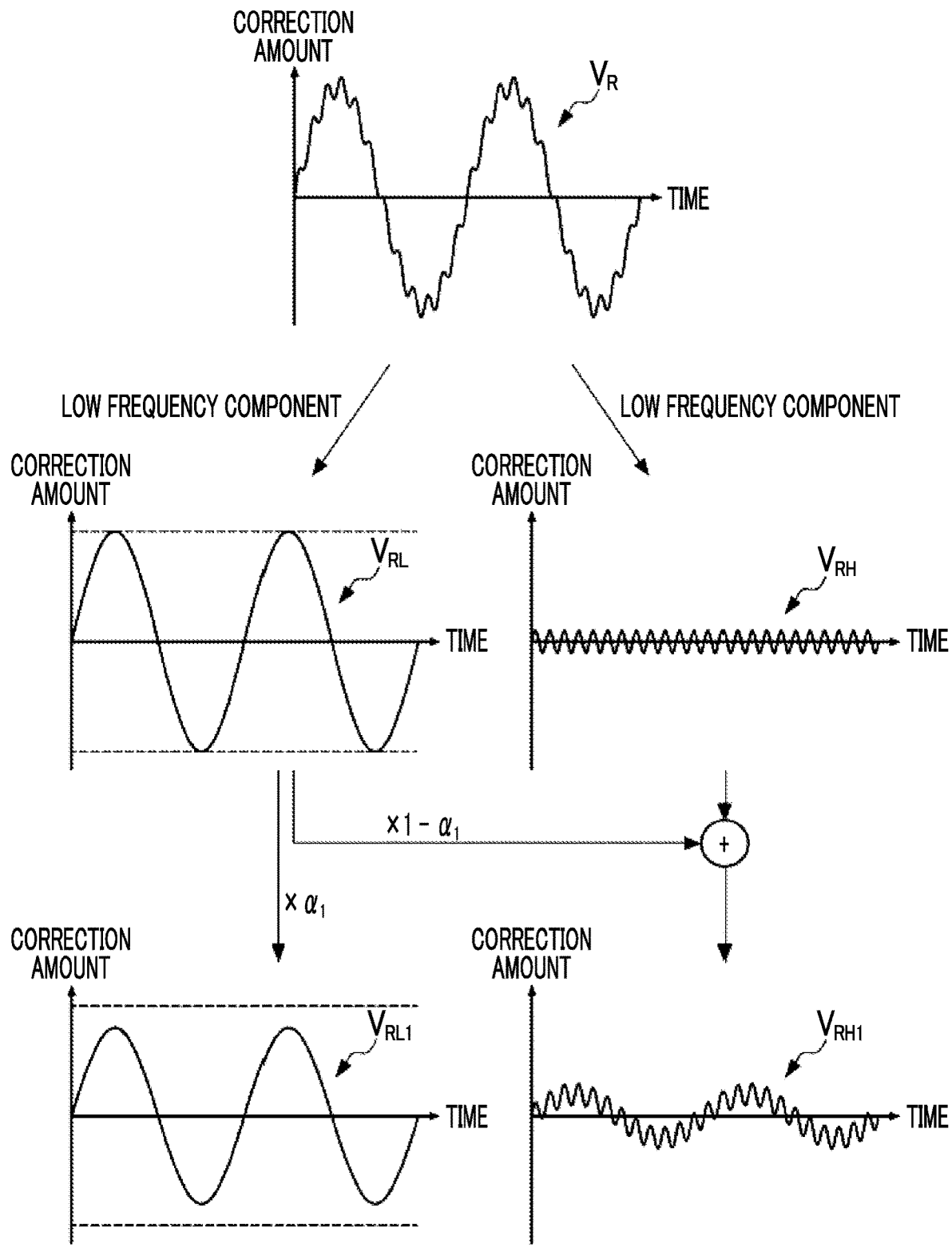
FIG. 6 is a diagram schematically showing a process in which the first distribution processing unit generates a first component and a second component on the basis of an angular velocity signal.
Figure 7A:
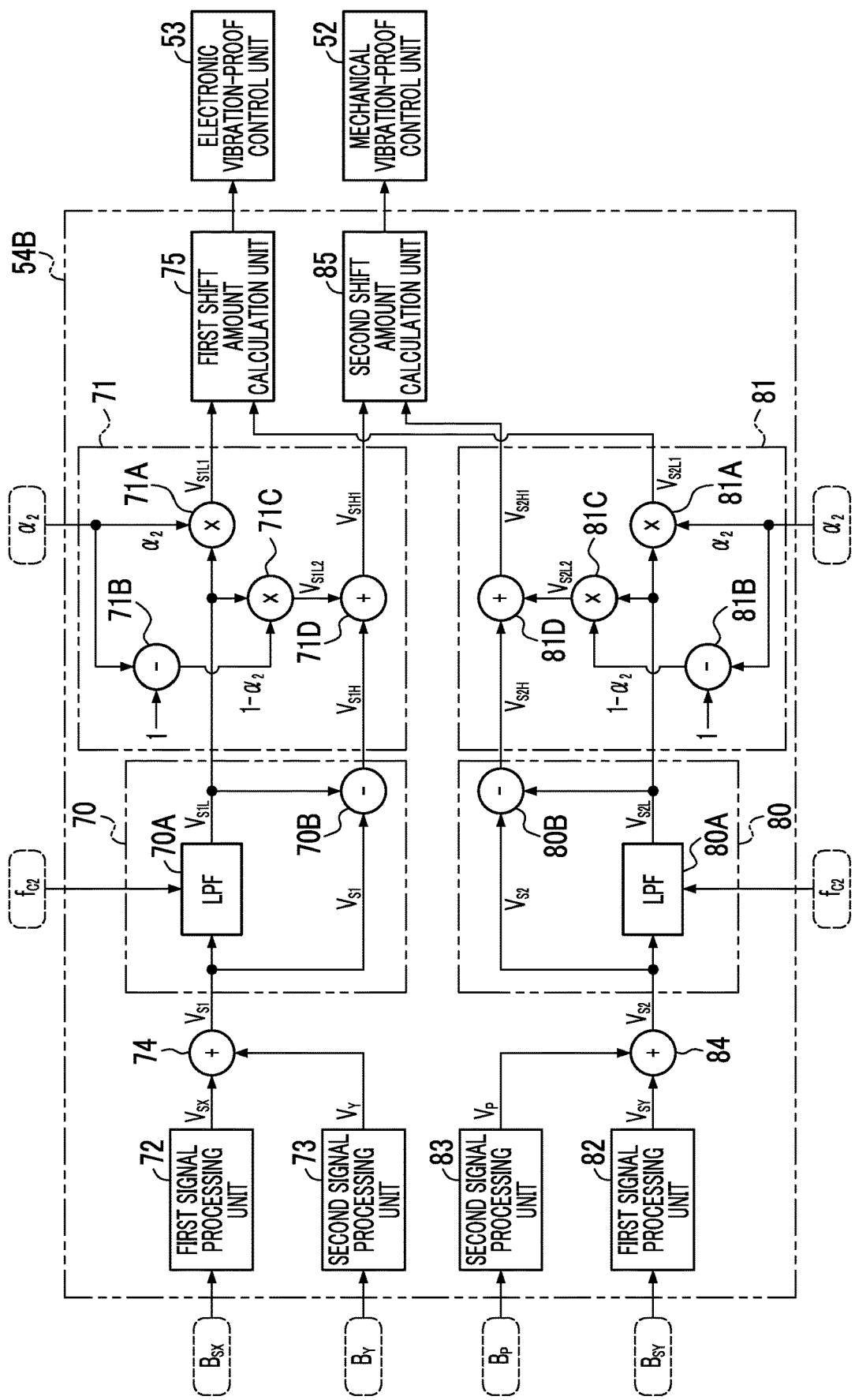
FIG. 7A is a diagram showing an example of a configuration of a second distribution processing unit.
Figure 7B:
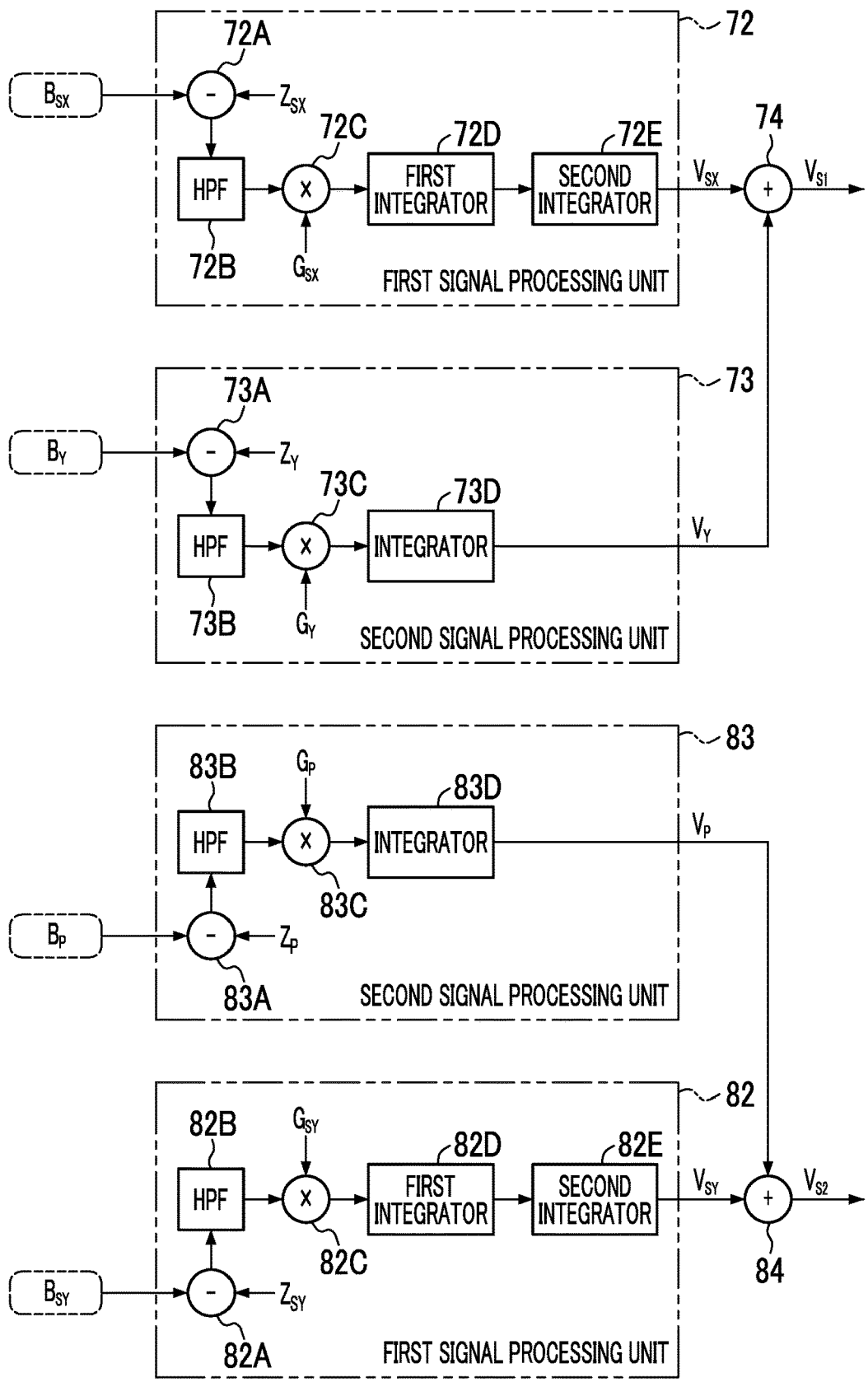
FIG. 7B is a diagram showing an example of configurations of a first signal processing unit and a second signal processing unit.

FIGS. 5 to 7 show an example of a configuration of the correction distribution processing unit 54. The correction distribution processing unit 54 is composed of a first distribution processing unit 54A that calculates a rotation amount for the rotational shake correction shown in FIG. 5 and a second distribution processing unit 54B that calculates a shift amount for the translational shake correction shown in FIGS. 7A and 7B.

FIG. 5 shows a configuration example of the first distribution processing unit 54A relating to the correction of the rotational shake. The first distribution processing unit 54A includes a signal processing unit 62, a frequency separation unit 60, an allotment unit 61, a first rotation amount calculation unit 63A, and a second rotation amount calculation unit 63B.

The signal processing unit 62 converts the angular velocity signal $B_R$ that indicates the rotational shake into a correction amount $V_R$ that indicates the angular information, and outputs the correction amount $V_R$. The signal processing unit 62 includes, for example, a subtractor 62A, a high-pass filter (hereinafter referred to as HPF) 62B, a multiplier 62C, and an integrator 62D.

The subtractor 62A performs offset correction by subtracting a zero point correction value $Z_R$ from the angular velocity signal $B_R$. The zero point correction value $Z_R$ is an output value from the gyro sensor 44A in a case where the gyro sensor 44A remains stationary. The HPF 62B cannot be completely removed by the offset correction using the subtractor 62A, and the residual DC component is removed.

The multiplier 62C performs gain correction by multiplying an output signal generated from the HPF 62B by a gain value $G_R$. The gain value $G_R$ is a value determined by either a focal length of the imaging lens 12 or a sensitivity of the gyro sensor 44A. In a case of the rotational shake, the gain value $G_R$ does not depend on the focal length of the imaging lens 12. The integrator 62D generates and outputs the correction amount $V_R$ that indicates angular information by integrating an output signal generated from the multiplier 62C.

The frequency separation unit 60 separates the correction amount $V_R$, which is output from the signal processing unit 62, into a low frequency component $V_{RL}$ and a high frequency component $V_{RH}$, and outputs the separated low frequency component $V_{RL}$ and high frequency component $V_{RH}$. The frequency separation unit 60 is composed of, for example, a low-pass filter (hereinafter referred to as LPF) 60A and a subtractor 60B. The separation frequency $f_{c1}$ which is input from the main control unit 50 is set in the LPF 60A. The separation frequency $f_{c1}$ corresponds to a cutoff frequency of the LPF 60A. The cutoff frequency is, for example, a frequency at which a gain decreases by 3 dB from a flat portion in the pass region of the frequency characteristics.

The LPF 60A passes a frequency component smaller than the separation frequency $f_{c1}$ in the input correction amount $V_R$ as the low frequency component $V_{RL}$. The subtractor 60B generates the high frequency component $V_{RH}$ by subtracting the low frequency component $V_{RL}$ which is output from the LPF 60A from the correction amount $V_R$ input to the LPF 60A. The low frequency component $V_{RL}$ is an example of the first frequency component according to the technique of the present disclosure. The high frequency component $V_{RH}$ is an example of the second frequency component according to the technique of the present disclosure. The frequency separation unit 60 is not limited to the low-pass filter, and may be composed of a high-pass filter and a subtractor.

The low frequency component $V_{RL}$ and the high frequency component $V_{RH}$ which is output from the frequency separation unit 60 are input to the allotment unit 61. Further, a coefficient $\alpha_1$ which is input from the main control unit 50 is set in the allotment unit 61. The allotment unit 61 allots a part of the low frequency component $V_{RL}$ to the high frequency component $V_{RH}$ on the basis of the coefficient $\alpha_1$. Specifically, the allotment unit 61 generates a first component $V_{RL1}$ by multiplying the low frequency component $V_{RL}$ by the coefficient $\alpha_1$. Further, the allotment unit 61 generates a second component $V_{RH1}$ by adding a component obtained by multiplying the low frequency component $V_{RL}$ by $(1-\alpha_1)$ to the high frequency component $V_{RH}$.

Specifically, the allotment unit 61 includes a multiplier 61A, a subtractor 61B, a multiplier 61C, and an adder 61D. The multiplier 61A generates the first component $V_{RL1}$ by multiplying the low frequency component $V_{RL}$ which is output from the frequency separation unit 60 by the coefficient $\alpha_1$. The subtractor 61B generates a value of $(1-\alpha_1)$ by subtracting the coefficient $\alpha_1$ from a constant of 1. The multiplier 61C generates an addition component $V_{RL2}$ by multiplying the low frequency component $V_{RL}$ which is output from the frequency separation unit 60 by $(1-\alpha_1)$. The adder 61D generates the second component $V_{RH1}$ by adding the addition component $V_{RL2}$ to the high frequency component $V_{RH}$ which is output from the frequency separation unit 60.

The first component $V_{RL1}$ and the second component $V_{RH1}$ are output from the allotment unit 61. The first component $V_{RL1}$ and the second component $V_{RH1}$ are respectively input to the first rotation amount calculation unit 63A and the second rotation amount calculation unit 63B.

The first rotation amount calculation unit 63A calculates a first rotation amount on the basis of the first component $V_{RL1}$ and inputs the calculated first rotation amount to the electronic vibration-proof control unit 53. The second rotation amount calculation unit 63B calculates a second rotation amount on the basis of the second component $V_{RH1}$ and inputs the calculated second rotation amount to the mechanical vibration-proof control unit 52.

The electronic vibration-proof control unit 53 controls the image processing unit 41 to rotate the recording region by an angle corresponding to the first rotation amount. The mechanical vibration-proof control unit 52 controls the mechanical vibration-proof mechanism 43 to rotate the imaging sensor 20 in the roll direction by an angle corresponding to the second rotation amount.

FIG. 6 schematically shows a processing in which the first distribution processing unit 54A generates the first component $V_{RL1}$ and the second component $V_{RH1}$ on the basis of the correction amount $V_R$. FIG. 6 shows an example of the correction amount $V_R$, the low frequency component $V_{RL}$, the high frequency component $V_{RH}$, the first component $V_{RL1}$, and the second component $V_{RH1}$, in a case where $\alpha_1=0.8$. It should be noted that the vertical axis of the graph of FIG. 6 indicates a correction amount (angle) for correcting the rotational shake.

FIG. 7A shows a configuration example of the second distribution processing unit 54B relating to the correction of the translational shake. The second distribution processing unit 54B includes first signal processing units 72 and 82, second signal processing units 73 and 83, frequency separation units 70 and 80, allotment units 71 and 81, a first shift amount calculation unit 75, a second shift amount calculation unit 85, and adders 74 and 84.

The first signal processing unit 72 converts an acceleration signal $B_{SX}$, which indicates the translational shake in the X direction, into a correction amount $V_{SX}$, which indicates the positional information, and outputs the correction amount $V_{SX}$. The second signal processing unit 73 converts an angular velocity signal $B_Y$, which indicates the angular shake in the yaw direction, into a correction amount $V_Y$, which indicates the angular information, and outputs the correction amount $V_Y$.

A total correction amount $V_{S1}$ obtained by adding the correction amount $V_Y$, which is output from the second signal processing unit 73, to the correction amount $V_{SX}$, which is output from the first signal processing unit 72, is input to the frequency separation unit 70. The adder 74 performs the addition of the correction amount $V_Y$ to the correction amount $V_{SX}$. Hereinafter, the shake in which the angular shake is added to the translational shake is referred to as a total shake.

The frequency separation unit 70 separates the total correction amount $V_{S1}$ for correcting the total shake in the X direction and the yaw direction into a low frequency component $V_{S1L}$ and a high frequency component $V_{S1H}$, and outputs the separated low frequency component $V_{S1L}$ and high frequency component $V_{S1H}$. The frequency separation unit 70 is composed of an LPF 70A and a subtractor 70B. The separation frequency $f_{c2}$ which is input from the main control unit 50 is set in the LPF 70A. The separation frequency $f_{c2}$ corresponds to a cutoff frequency of the LPF 70A. The operation of the frequency separation unit 70 is the same as the operation of the frequency separation unit 60 described above.

The low frequency component $V_{S1L}$ and the high frequency component $V_{S1H}$, which are output from the frequency separation unit 70, are input to the allotment unit 71. Further, the coefficient $\alpha_2$ which is input from the main control unit 50 is set in the allotment unit 71. The allotment unit 71 allots a part of the low frequency component $V_{S1L}$ to the high frequency component $V_{S1H}$ on the basis of the coefficient $\alpha_2$. Specifically, the allotment unit 71 generates the first component $V_{S1L1}$ by multiplying the low frequency component $V_{S1L}$ by the coefficient $\alpha_2$. Further, the allotment unit 71 generates a second component $V_{S1H1}$ by adding a component obtained by multiplying the low frequency component $V_{S1L}$ by $(1-\alpha_2)$ to the high frequency component $V_{S1H}$.

The allotment unit 71 includes a multiplier 71A, a subtractor 71B, a multiplier 71C, and an adder 71D. The specific configuration of the allotment unit 71 is the same as that of the allotment unit 61 described above.

The first component $V_{S1L1}$ and the second component $V_{S1H1}$ are output from the allotment unit 71. The first component $V_{S1L1}$ and the second component $V_{S1H1}$ are respectively input to the first shift amount calculation unit 75 and the second shift amount calculation unit 85.

The first signal processing unit 82 converts the acceleration signal $B_{SY}$, which indicates the translational shake in the Y direction, into the correction amount $V_{SY}$, which indicates the positional information, and outputs the correction amount $V_{SY}$. The second signal processing unit 83 converts an angular velocity signal $B_P$, which indicates the angular shake in the pitch direction, into a correction amount $V_P$, which indicates the angular information, and outputs the correction amount $V_P$.

A total correction amount $V_{S2}$ obtained by adding the correction amount $V_P$, which is output from the second signal processing unit 83, to the correction amount $V_{SY}$, which is output from the first signal processing unit 82, is input to the frequency separation unit 80. The adder 84 performs the addition of the correction amount $V_P$ to the correction amount $V_{SY}$.

The frequency separation unit 80 separates the total correction amount $V_{S2}$ for correcting the total shake in the Y direction and the pitch direction into the low frequency component $V_{S2L}$ and the high frequency component $V_{S2H}$, and outputs the separated low frequency component $V_{S2L}$ and high frequency component $V_{S2H}$. The frequency separation unit 80 is composed of an LPF 80A and a subtractor 80B. The separation frequency $f_{c2}$ which is input from the main control unit 50 is set in the LPF 80A. The separation frequency $f_{c2}$ corresponds to a cutoff frequency of the LPF 80A. The operation of the frequency separation unit 80 is the same as the operation of the frequency separation unit 60 described above. In the present embodiment, the separation frequency $f_{c2}$ the same as that of the frequency separation unit 70 is set in the frequency separation unit 80, but a separation frequency different from that of the frequency separation unit 70 may be set.

The low frequency component $V_{S2L}$ and the high frequency component $V_{S2H}$ which are output from the frequency separation unit 80 are input to the allotment unit 81. Further, the coefficient $\alpha_2$ which is input from the main control unit 50 is set in the allotment unit 81. The allotment unit 81 allots a part of the low frequency component $V_{S2L}$ to the high frequency component $V_{S2H}$ on the basis of the coefficient $\alpha_2$. Specifically, the allotment unit 81 generates the first component $V_{S2L1}$ by multiplying the low frequency component $V_{S2L}$ by the coefficient $\alpha_2$, and generates the second component $V_{S2H1}$ by adding a component, which is obtained by multiplying the low frequency component $V_{S2L}$ by $(1-\alpha_2)$, to the high frequency component $V_{S2H}$.

The allotment unit 81 includes a multiplier 81A, a subtractor 81B, a multiplier 81C, and an adder 81D. The specific configuration of the allotment unit 81 is the same as that of the allotment unit 61 described above. In the present embodiment, the coefficient $\alpha_2$ the same as that of the allotment unit 71 is set in the allotment unit 81, but a coefficient different from that of the allotment unit 71 may be set.

The first component $V_{S2L1}$ and the second component $V_{S2H1}$ are output from the allotment unit 81. The first component $V_{S2L1}$ and the second component $V_{S2H1}$ are respectively input to the first shift amount calculation unit 75 and the second shift amount calculation unit 85.

The first shift amount calculation unit 75 calculates a first shift amount that indicates a shift amount in the X direction and the Y direction on the basis of the first components $V_{S1L1}$ and $V_{S2L1}$, and inputs the calculated first shift amount to the electronic vibration-proof control unit 53. The second shift amount calculation unit 85 calculates a second shift amount that indicates a shift amount in the X direction and the Y direction on the basis of the second components $V_{S1H1}$ and $V_{S2H1}$, and inputs the calculated second shift amount to the mechanical vibration-proof control unit 52.

Various signal waveforms, which are generated by the second distribution processing unit 54B, are the same as the signal waveforms shown in FIG. 6.

FIG. 7B shows an example of configurations of the first signal processing units 72 and 82 and the second signal processing units 73 and 83. The first signal processing unit 72 includes, for example, a subtractor 72A, an HPF 72B, a multiplier 72C, a first integrator 72D, and a second integrator 72E. The first signal processing unit 72 has two integrators including a first integrator 72D and a second integrator 72E, in order to convert an acceleration signal $B_{SX}$, which is a second-order differential value of the positional information, into the positional information.

Similar to the signal processing unit 62 shown in FIG. 5, the subtractor 72A performs offset correction by subtracting a zero point correction value $Z_{SX}$ from the acceleration signal $B_{SX}$. The zero point correction value $Z_{SX}$ is an output value from the acceleration sensor 44B in a case where the acceleration sensor 44B remains stationary. The HPF 72B removes the residual DC component by the offset correction through the subtractor 72A. The multiplier 72C performs gain correction by multiplying the output signal from the HPF 72B by a gain value $G_{SX}$. The gain value $G_{SX}$ is a value determined by either a focal length of the imaging lens 12 or a sensitivity of the acceleration sensor 44B.

The first integrator 72D outputs an integrated value which is obtained by integrating the output signals from the multiplier 72C. The second integrator 72E generates and outputs a correction amount $V_{SX}$ that indicates positional information by integrating an integrated value which is output from the first integrator 72D.

The second signal processing unit 73 includes, for example, a subtractor 73A, an HPF 73B, a multiplier 73C, and an integrator 73D. A configuration of the second signal processing unit 73 is the same as the configuration of the signal processing unit 62 shown in FIG. 5.

The first signal processing unit 82 includes, for example, a subtractor 82A, an HPF 82B, a multiplier 82C, a first integrator 82D, and a second integrator 82E. A configuration of the first signal processing unit 82 is the same as the configuration of the first signal processing unit 72.

The second signal processing unit 83 includes, for example, a subtractor 83A, an HPF 83B, a multiplier 83C, and an integrator 83D. A configuration of the second signal processing unit 83 is the same as the configuration of the signal processing unit 62 shown in FIG. 5.

(Method of Each Vibration-Proof Processing)

Figure 8:
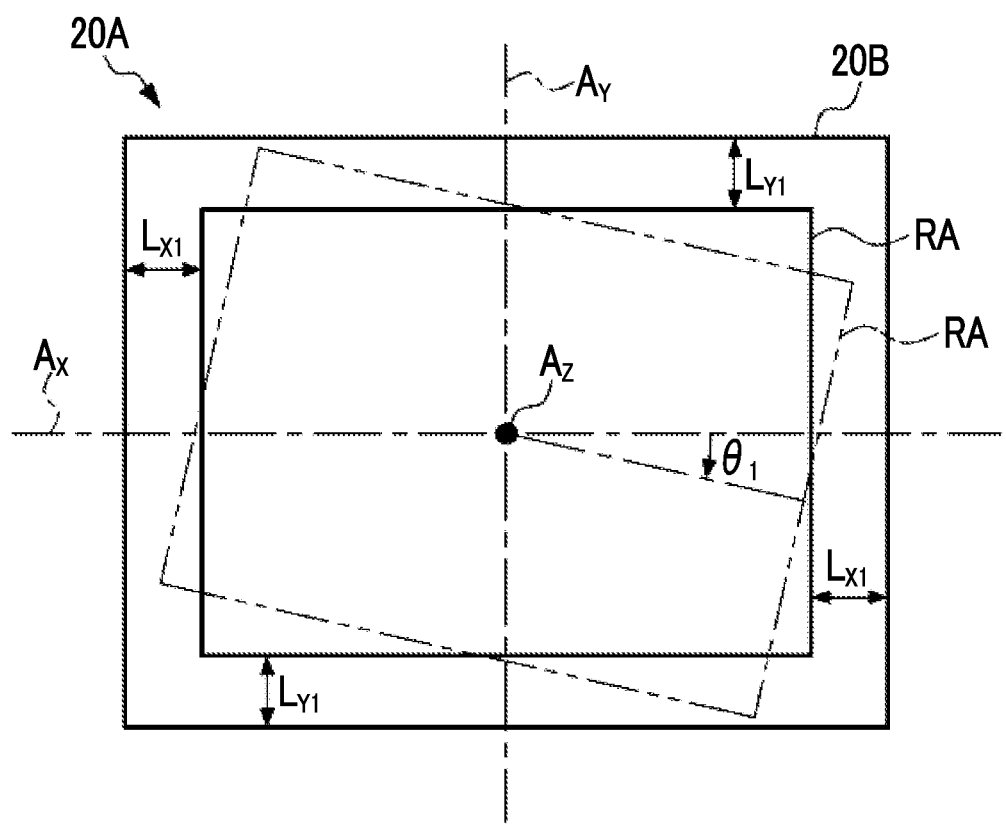
FIG. 8 is a diagram showing an example of electronic vibration-proof processing.

FIG. 8 shows an example of the electronic vibration-proof processing. In FIG. 8, the reference numeral 20B indicates an imaging region on the light-receiving surface 20A of the imaging sensor 20. An imaging region 20B is, for example, an effective pixel region. Further, the reference numeral RA is a recording region for cutting out an image signal from the imaging region 20B and recording the image signal as image data. The image data which is acquired from the imaging region 20B is recorded in, for example, the memory 45.

The electronic vibration-proof control unit 53 shifts and/or rotates a recording region RA in the imaging region 20B. Specifically, the electronic vibration-proof control unit 53 shifts the recording region RA in the X direction and the Y direction, and rotates the recording region RA in the roll direction. The recording region RA can be shifted by $\pm L_{X1}$ in the X direction, can be shifted by $\pm L_{Y1}$ in the Y direction, and can be rotated by $\pm \theta_1$ in the roll direction. The two-dot chain line in FIG. 8 indicates the recording region RA which is rotated by $\theta_1$ in the roll direction.

Figure 9:
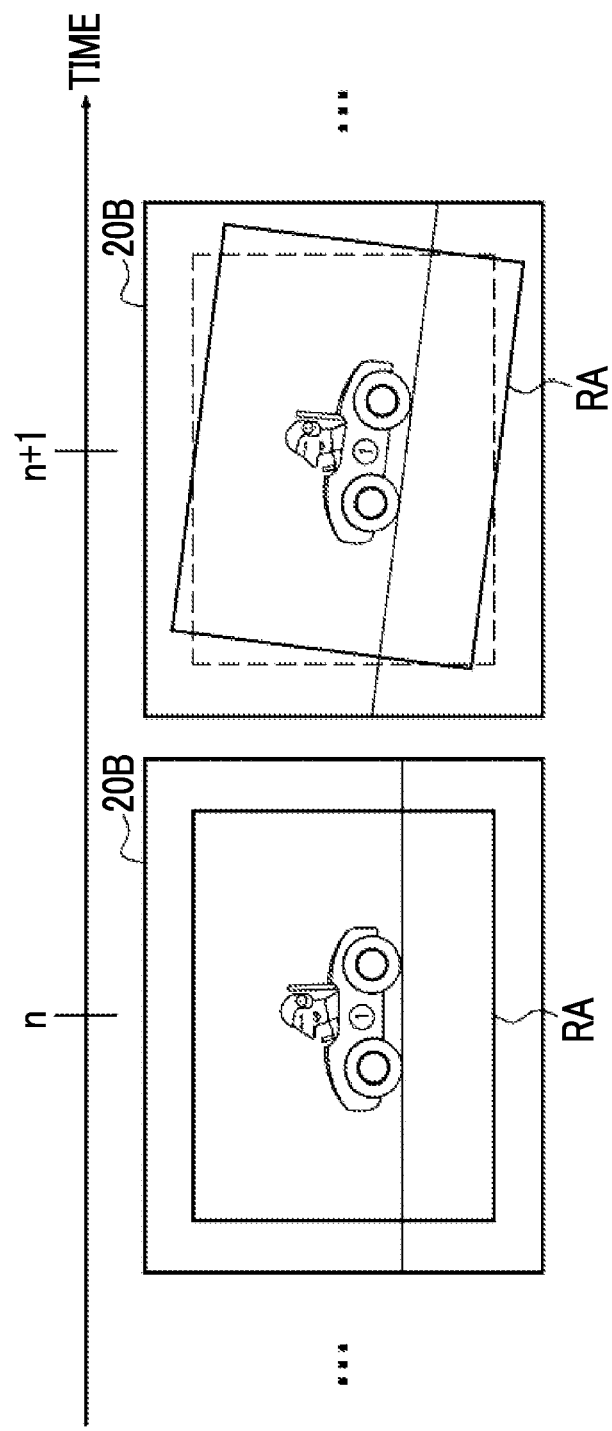
FIG. 9 is a diagram showing change in a recording region in the electronic vibration-proof processing.

The electronic vibration-proof control unit 53 corrects a part of the rotational shake and the translational shake by changing the recording region RA which is selected from the imaging region 20B between the plurality of frames. For example, as shown in FIG. 9, the electronic vibration-proof control unit 53 changes the recording region RA for each frame, that is, rotates and shifts the recording region RA.

The electronic vibration-proof control unit 53 rotates and shifts the recording region RA on the basis of the first rotation amount and the first shift amount described above, thereby correcting a part of the rotational shake and the translational shake.

Figure 10:
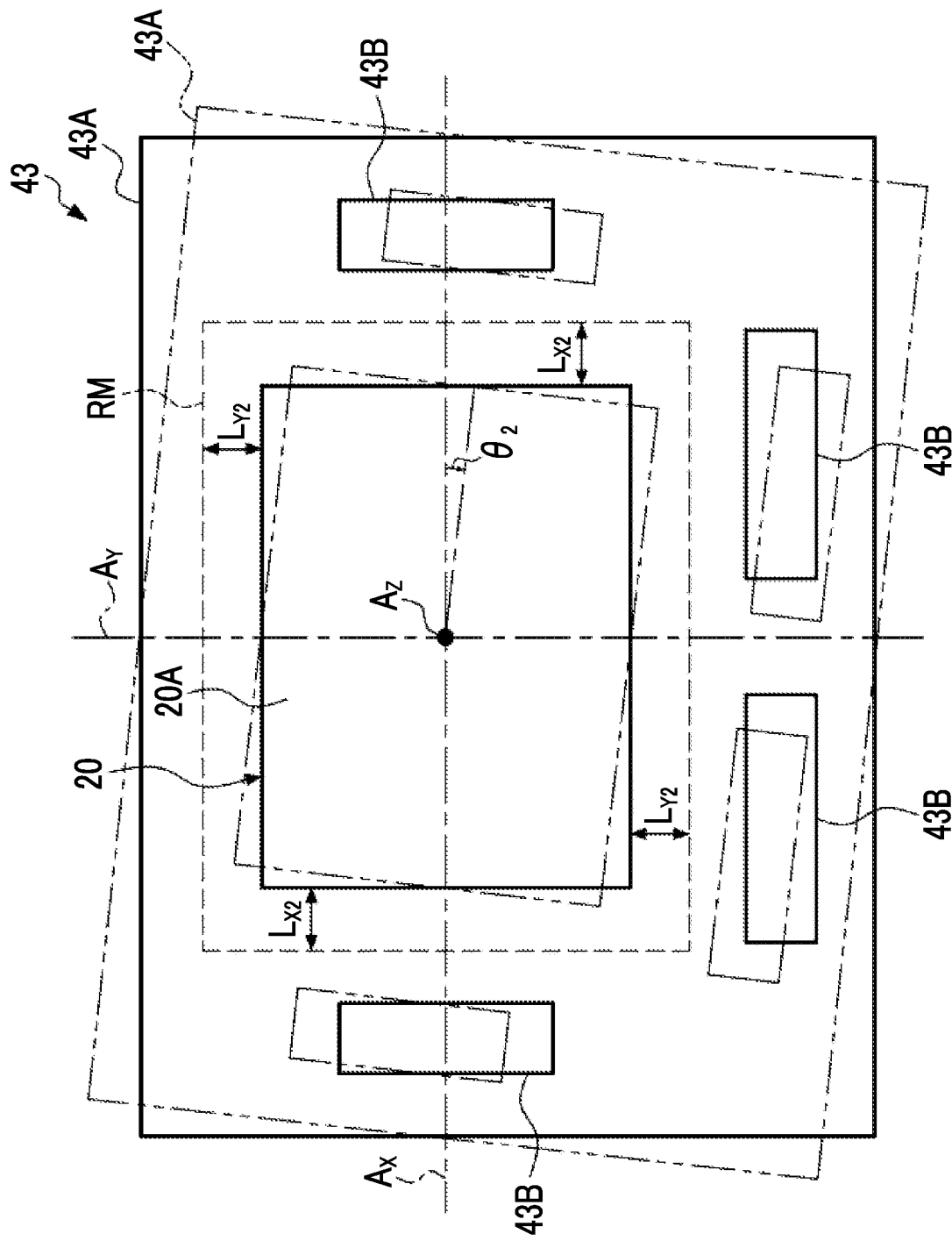
FIG. 10 is a diagram showing an example of mechanical vibration-proof processing.

FIG. 10 shows an example of the mechanical vibration-proof processing. The mechanical vibration-proof mechanism 43 includes a movable portion 43A. The imaging sensor 20 is disposed at the center of the movable portion 43A. Four coils 43B are disposed around the imaging sensor 20 of the movable portion 43A. The movable portion 43A is driven by an electromagnetic force between a yoke (not shown in the drawing) provided in a fixed portion fixed to the body 11 (refer to FIG. 3) and the coil 43B. One yoke is provided for each coil 43B.

The mechanical vibration-proof control unit 52 (refer to FIG. 4) shifts and/or rotates the movable portion 43A by controlling currents flowing through the four coils 43B. Specifically, the mechanical vibration-proof control unit 52 is able to shift the movable portion 43A in the X direction and the Y direction, and to rotate the movable portion 43A in the roll direction.

In FIG. 10, the reference numeral RM indicates a movable range in which the imaging sensor 20 is able to shift. The movable range RM is a range determined by the design of the mechanical vibration-proof mechanism 43. The imaging sensor 20 can be shifted by $\pm L_{X2}$ in the X direction and by $\pm L_{Y2}$ in the Y direction. Further, the imaging sensor 20 is able to rotate by $\pm \theta_2$ in the roll direction. The two-dot chain line in FIG. 10 indicates the movable portion 43A which is rotated by $\theta_2$ in the roll direction.

The mechanical vibration-proof control unit 52 rotates and shifts the movable portion 43A on the basis of the above-mentioned second rotation amount and second shift amount, thereby correcting a part of the rotational shake and the translational shake.

The above-mentioned coefficient $\alpha_1$ (refer to FIG. 5) is determined, for example, on the basis of a reference coefficient $\kappa_1$ which is represented by Expression (1).

$$\kappa_1 = \theta_1/(\theta_1 + \theta_2) \quad (1)$$

The reference coefficient $\kappa_1$ indicates a ratio of an amount of correctable rotational shake that can be corrected only by the electronic vibration-proof operation to an amount of correctable rotational shake that can be corrected by the electronic vibration-proof operation and the mechanical vibration-proof operation. The coefficient $\alpha_1$ is determined by multiplying the reference coefficient $\kappa_1$ by a parameter relating to the frame rate FR or the like.

The above-mentioned coefficient $\alpha_2$ (refer to FIGS. 7A and 7B) is determined, for example, on the basis of the reference coefficient $\kappa_1$ which is represented by Expression (2).

$$\kappa_2 = L_{x1}/(L_{x1} + L_{x2}) \quad (2)$$

Here, $L_{x1} = L_{Y1}$ and $L_{x2} = L_{Y2}$. $L_{x1}$ is represented in units of length (for example, millimeters). In contrast, $L_{x2}$ is represented in units of pixel pitch (for example, distance between pixel centers). Therefore, calculation of Expression (2) may be performed after converting $L_{x2}$ into a unit of length.

A reference coefficient $\kappa_2$ indicates a ratio of an amount of correctable translational shake that can be corrected only by the electronic vibration-proof operation to an amount of correctable translational shake that can be corrected by the electronic vibration-proof operation and the mechanical vibration-proof operation. The coefficient $\alpha_2$ is determined by multiplying the reference coefficient $\kappa_2$ by a parameter relating to the frame rate FR or the like.

(Correction Distribution Ratio for Rotational Shake Correction)

Figure 11:
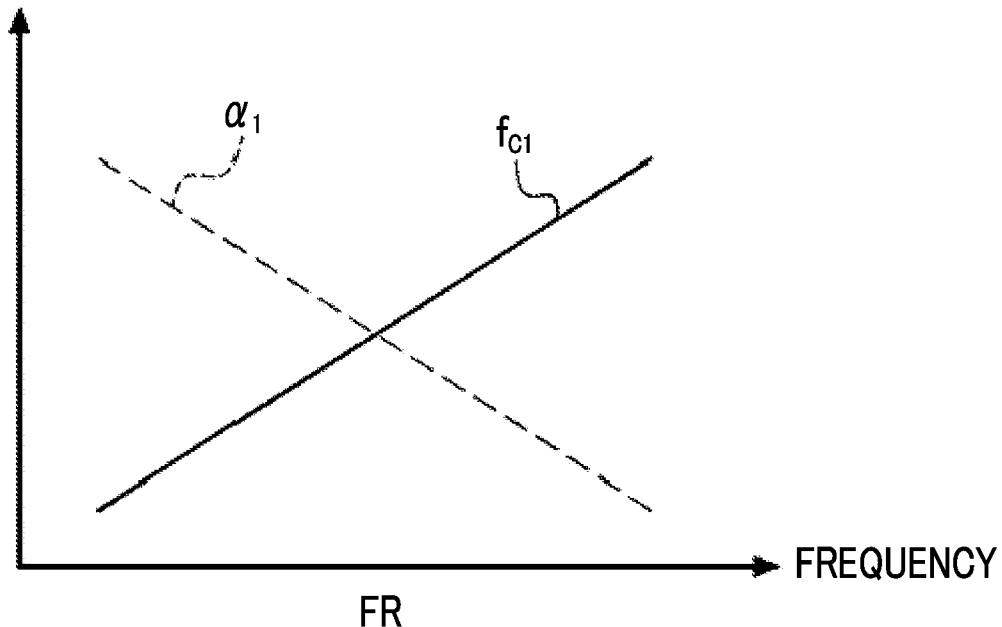
FIG. 11 is a diagram showing an example of a relationship between a frame rate and a separation frequency and a coefficient relating to correction of rotational shake.

FIG. 11 shows an example of a relationship between the frame rate FR and the coefficient $\alpha_1$ and the separation frequency $f_{c1}$ relating to the correction of the rotational shake. The correction of the rotational shake performed by the electronic vibration-proof processing has a higher calculation load than the correction of the translational shake since it is necessary to perform calculation such as pixel complementation. Further, the coefficient $\alpha_1$ indicates the correction distribution ratio of the electronic vibration-proof processing. Therefore, the larger the coefficient $\alpha_1$, the higher the correction calculation load of the rotational shake to the electronic vibration-proof processing. If a frame rate FR is increased while the coefficient $\alpha_1$ is constant, there is a possibility that the correction of the rotational shake is not completed within one frame period. For this reason, it is preferable that the coefficient $\alpha_1$ is set to be smaller as the frame rate FR is higher. Further, it is preferable that the coefficient $\alpha_1$ is determined from the relationship between the correction time of the rotational shake and the frame rate FR such that the correction of the rotational shake is completed within one frame period.

It is possible to shorten the correction time of the rotational shake by enhancing the computing power of the image processing unit 41. However, enhancing the computing power of the image processing unit 41 is not preferable in terms of an increase in cost of the image processing unit 41 and an increase in power consumption.

The electronic vibration-proof processing is processing of correcting shake between frames. Therefore, it is not possible in principle to correct shake higher than a frequency of ½ times the frame rate FR on the basis of the sampling theorem. For this reason, it is preferable that the separation frequency $f_{c1}$ is set to a value of ½ or less of the frame rate FR. For example, the separation frequency $f_{c1}$ is set to a value which is ½ of the frame rate FR.

For example, the coefficient $\alpha_1$ is set to be proportional to the frame rate FR and the separation frequency $f_{c1}$ is set to be inversely proportional to the frame rate FR.

The same applies to setting of the coefficient $\alpha_2$ and the separation frequency $f_{c2}$ relating to the correction of the translational shake. However, the calculation load of the translational shake correction is lower than that of the rotational shake correction as described above. Therefore, the coefficient $\alpha_2$ may be a value different from the coefficient $\alpha_1$ relating to the rotational shake correction. That is, the correction distribution ratio of the translational shake may be different from the correction distribution ratio of the rotational shake. For example, in the same frame rate FR, $\alpha_2 > \alpha_1$. The separation frequency $f_{c2}$ may be the same value as the separation frequency $f_{c1}$ relating to correction of the rotational shake, that is, $f_{c2} = f_{c1}$.

Figure 12:
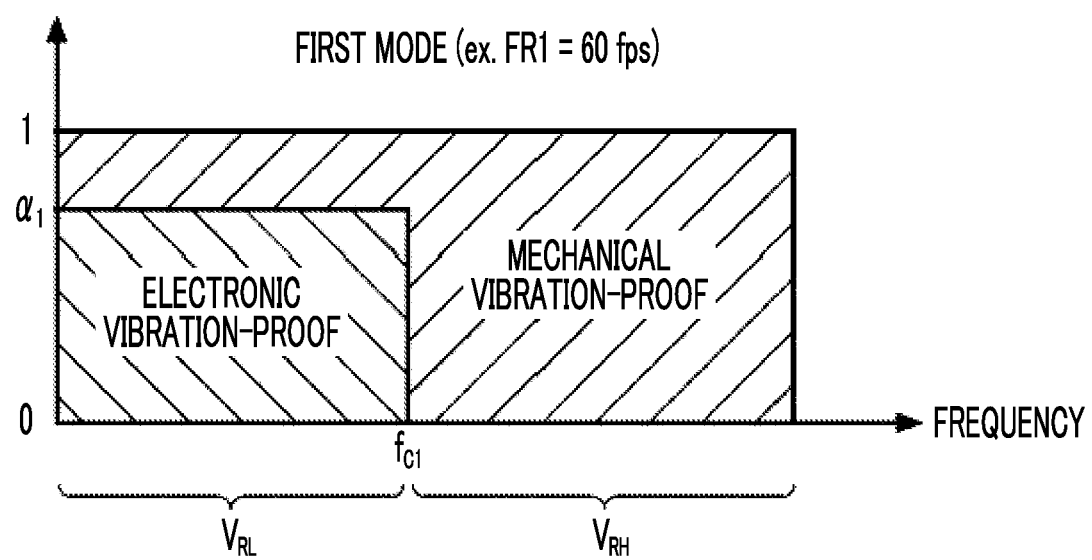
FIG. 12 is a diagram schematically showing a correction distribution ratio in the first mode.
Figures 13, 14:
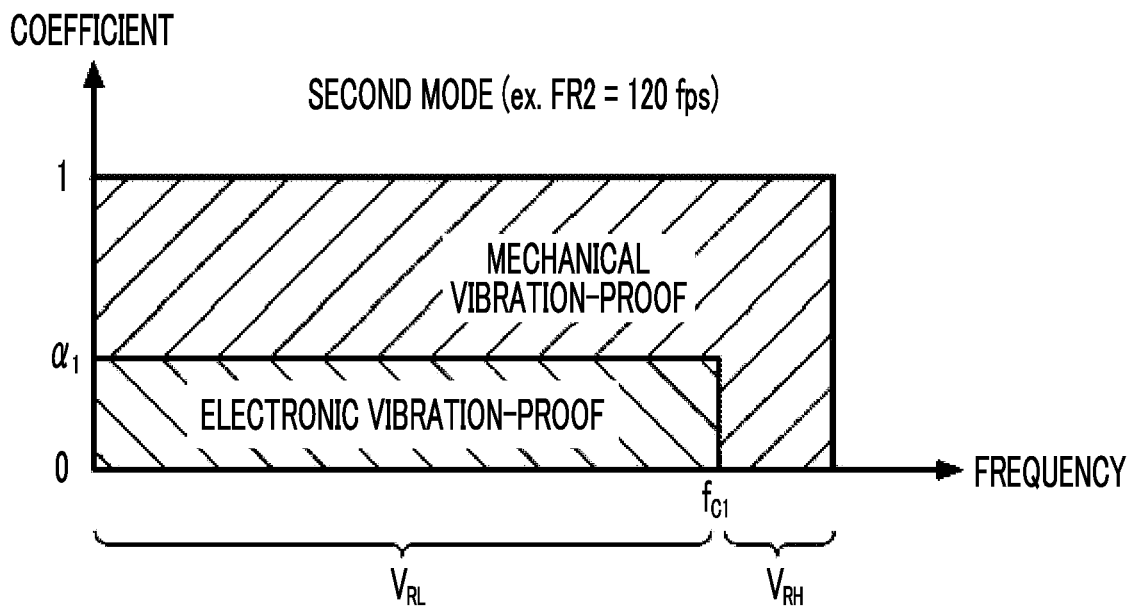
FIG. 13 is a diagram schematically showing a correction distribution ratio in the second mode.
FIG. 14 is a diagram showing an example of a LUT.

FIG. 12 and FIG. 13 schematically show the correction distribution ratios in the first mode and the second mode in which the frame rate FRs are different from each other. The first mode shown in FIG. 12 is a motion picture imaging mode in which imaging is performed at a first frame rate RF1 (for example, RF1=60 fps). The second mode shown in FIG. 13 is a motion picture imaging mode in which imaging is performed at a second frame rate RF2 (for example, RF2=120 fps). As shown in FIGS. 12 and 13, the correction distribution ratio of the electronic vibration-proof processing in the second mode is smaller than the correction distribution ratio of the electronic vibration-proof processing in the first mode.

In a case where the coefficient $\alpha_1$ is proportional to the frame rate FR and the separation frequency $f_{c1}$ is inversely proportional to the frame rate FR as described above, the product of the coefficient $\alpha_1$ and the separation frequency $f_{c1}$ (corresponding to an area of electronic vibration-proof shown in FIGS. 12 and 13) is equal in the first mode and the second mode.

FIG. 14 shows an example of the LUT 55. In the LUT 55, a relationship between the frame rate FR, the coefficients $\alpha_1$ and $\alpha_2$, and the separation frequencies $f_{c1}$ and $f_{c2}$ is recorded.

Figure 15:
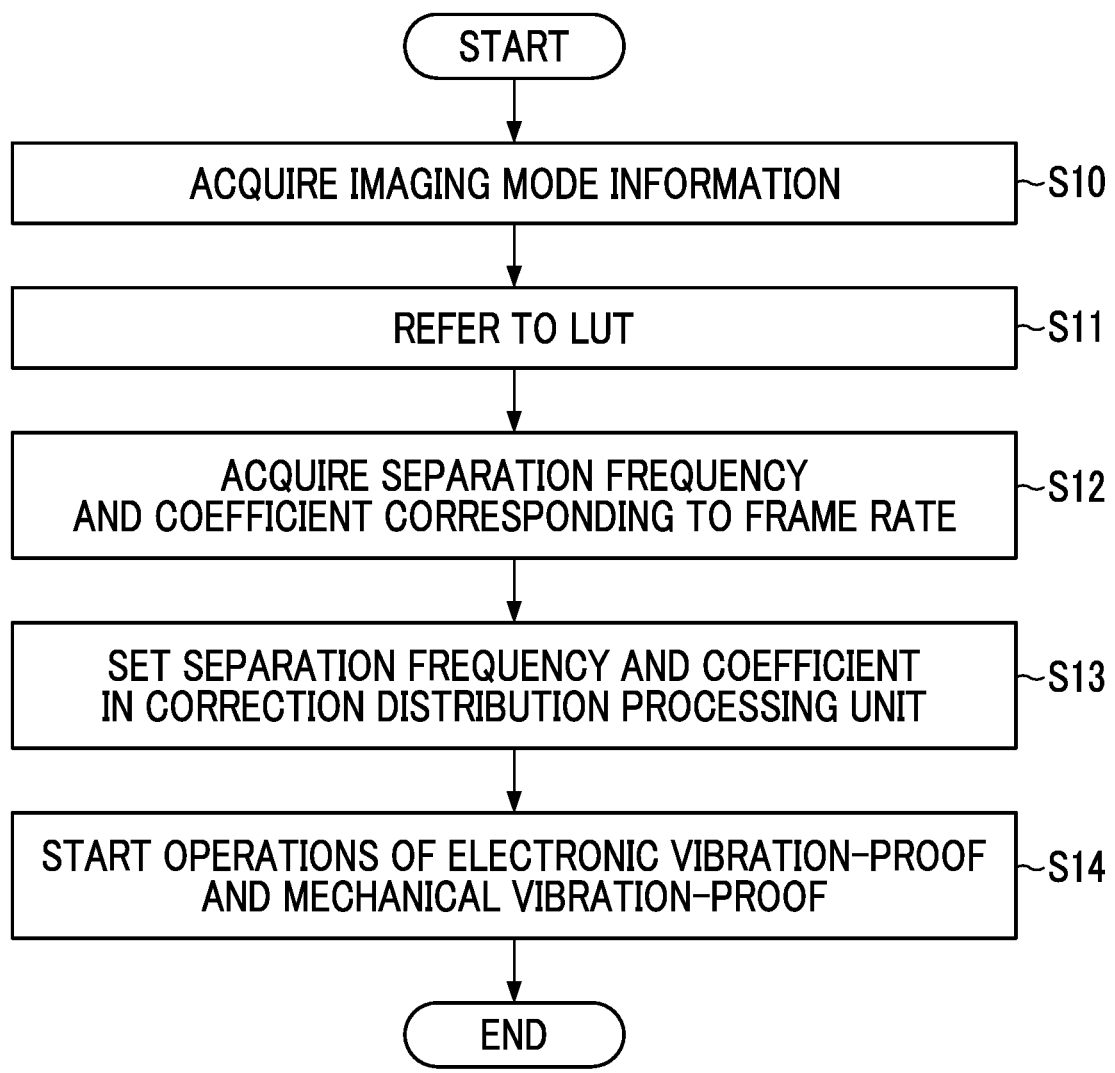
FIG. 15 is a flowchart showing an example of processing of setting the coefficient and the separation frequency.

FIG. 15 is a flowchart showing processing of setting the coefficients $\alpha_1$ and $\alpha_2$ and the separation frequencies $f_{c1}$ and $f_{c2}$ by using the main control unit 50. The main control unit 50 acquires information (hereinafter referred to as imaging mode information) of the selected motion picture imaging mode in a case where one motion picture imaging mode is selected through the operation of the operating part 42 (step S10). The imaging mode information includes the frame rate FR in the selected imaging mode.

Next, the main control unit 50 acquires the coefficients $\alpha_1$ and $\alpha_2$ and the separation frequencies $f_{c1}$ and $f_{c2}$ corresponding to the frame rate FR included in the imaging mode information with reference to the LUT 55 stored in the memory 45 (step S11). (Step S12). That is, the main control unit 50 acquires the coefficients $\alpha_1$ and $\alpha_2$ corresponding to the frame rate FR with reference to the LUT 55, and determines the correction distribution ratio.

The main control unit 50 sets the acquired coefficients $\alpha_1$ and $\alpha_2$ and the separation frequencies $f_{c1}$ and $f_{c2}$ in the correction distribution processing unit 54 (step S13). Then, in a case in which an execution instruction of the motion picture imaging is issued through the operation of the operating part 42, the main control unit 50 starts the operations of the electronic vibration-proof and the mechanical vibration-proof (step S14).

As described above, according to the technique of the present disclosure, the higher the frame rate, the smaller the correction distribution ratio of the electronic vibration-proof. As a result, it is possible to appropriately perform the electronic vibration-proof even in a case of a high frame rate. In FIG. 12, the electronic vibration-proof region and the mechanical vibration-proof region are clearly separated by the separation frequency $f_{C1}$. However, FIG. 12 is only a schematic diagram. For example, the separation frequency $f_{C1}$ is used as, for example, a function of the coefficient $\alpha$, and is not limited to a constant frequency.

Hereinafter, various modification examples of the first embodiment will be described.

First Modification Example

In the first embodiment, the coefficient $\alpha_1$ corresponding to the correction distribution ratio for the rotational shake of the electronic vibration-proof is changed in accordance with the frame rate FR. However, in the first modification example, in a case where a specific motion picture imaging mode is selected, the coefficient $\alpha_1$ is set to 0. For example, in a case where the first mode and the second mode having a higher frame rate FR than the first mode are selectable, the coefficient $\alpha_1$ is set to 0 in accordance with the selection of the second mode. As a result, in the second mode, the correction distribution ratio for the rotational shake of the electronic vibration-proof processing is set to 0, and the mechanical vibration-proof processing is in charge of the entire correction of the rotational shake.

The same applies to the translational shake, and the coefficient $\alpha_2$ may be set to 0 in accordance with the selection of the second mode. As a result, in the second mode, the correction distribution ratio for the translational shake of the electronic vibration-proof processing is set to 0, and the mechanical vibration-proof processing is in charge of the entire correction of the translational shake.

Second Modification Example

Figure 16:
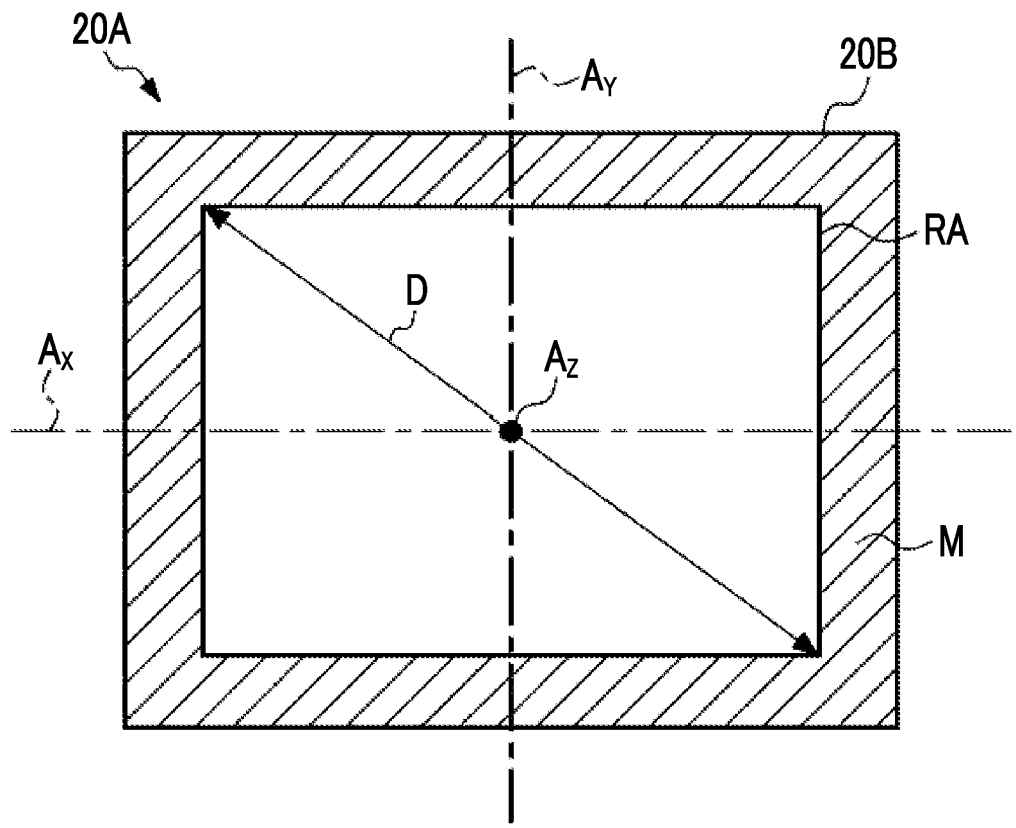
FIG. 16 is a diagram showing a relationship between a size of a recording region and an angle of view.

In the first embodiment, a size of the recording region RA (refer to FIG. 8) is constant, but in the second modification example, the size of the recording region RA is changed in accordance with the frame rate FR. As shown in FIG. 16, the size of the recording region RA is represented as a diagonal length D of the recording region RA. The length D corresponds to an angle of view of a captured image. Hereinafter, the size of the recording region RA is referred to as an angle of view D.

Figure 17:
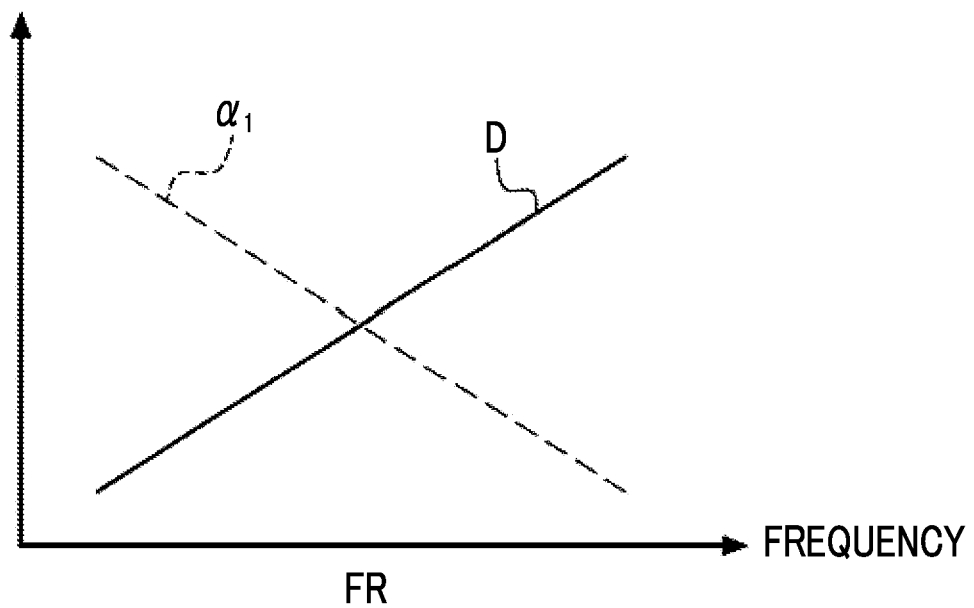
FIG. 17 is a diagram showing an example of a relationship between a frame rate and the coefficient and the angle of view relating to correction of rotational shake.

For example, as shown in FIG. 17, the larger the frame rate FR, the larger the angle of view D. That is, the recording region RA in the second mode is set to be larger than the recording region RA in the first mode. The reason for this is that the larger the frame rate FR, the smaller each of the coefficients $\alpha_1$ and $\alpha_2$ such that the margin M (refer to FIG. 16) necessary for the electronic vibration-proof processing can be reduced. The margin M is an extra region other than the recording region RA in the imaging region 20B. A degree of change in the angle of view D and the coefficient $\alpha$ with respect to the change in the frame rate FR is not limited to the example in FIG. 17.

Figures 18, 19:
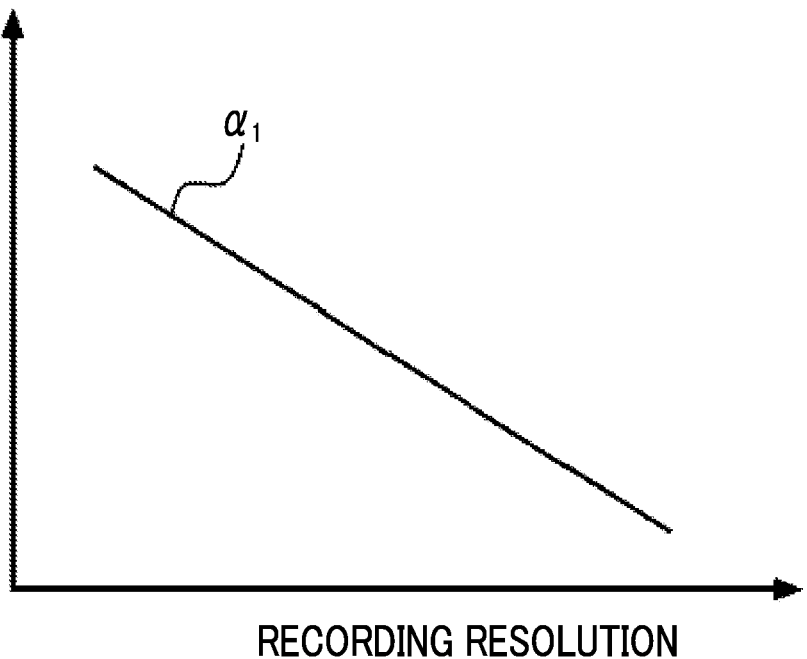
FIG. 18 is a diagram showing an example of the LUT in which the angle of view corresponding to the frame rate is recorded.
FIG. 19 is a diagram showing an example of a relationship between a recording resolution and the coefficient relating to correction of rotational shake.

In the case of the present modification example, as shown in FIG. 18, the angle of view D corresponding to the frame rate FR may be recorded in the LUT 55. The main control unit 50 may acquire the angle of view D corresponding to the frame rate FR with reference to the LUT 55, and set the acquired angle of view D in the electronic vibration-proof control unit 53.

According to the present modification example, it is possible to appropriately perform electronic vibration-proof even in a case where the frame rate is high, and it is possible to maintain the magnitude of the angle of view at a certain level or higher.

Third Modification Example

In the first embodiment, the coefficient $\alpha_1$ is constant regardless of the resolution of the image signal, but as a third modification example, the coefficient $\alpha_1$ is changed in accordance with the resolution of the image signal. For example, the coefficient $\alpha_1$ is changed in accordance with the recording resolution in recording the image signal in the recording region RA as the image data. For example, the recording resolution is controlled by a thinning amount in a case of generating the image data from the image signal in the recording region RA. The recording resolution can be set by a user operating the operating part 42.

For example, as shown in FIG. 19, the larger the recording resolution, the smaller the coefficient $\alpha_1$. The reason for this is that, as the recording resolution is larger, the amount of data relating to the rotational shake correction calculation performed by the electronic vibration-proof processing is larger, and the correction calculation load is higher. As described above, in a case where the recording resolution is large, the correction calculation load is increased. Therefore, in order to reduce the correction calculation load, it is preferable to reduce the coefficient $\alpha_1$ corresponding to the correction distribution ratio for the rotational shake of the electronic vibration-proof.

In the case of the present modification example, a plurality of LUTs 55 in which different coefficients $\alpha_1$ are recorded for each settable recording resolution may be created, and the created plurality of LUTs 55 may be stored in the memory 45. The main control unit 50 may refer to the LUT 55 corresponding to the recording resolution which is set by the operating part 42.

The same applies to the translational shake, and the coefficient $\alpha_2$ may be changed in accordance with the resolution (for example, the recording resolution) of the image signal.

Fourth Modification Example

In the fourth modification example, either the coefficient $\alpha_1$ or the coefficient $\alpha_2$ is changed in accordance with an optical zoom magnification or an electronic zoom magnification of the imaging lens 12 mounted on the body 11.

The optical zoom magnification is determined in accordance with a position (zoom position) of a zoom lens in a lens barrel. The degree of peripheral dimming or reduction in peripheral resolution of the imaging angle of view varies depending on the zoom position. Therefore, it is necessary to set a movable range of the mechanical vibration-proof mechanism 43 for each zoom position. In FIG. 10, as a general tendency, the movable range of the mechanical vibration-proof mechanism 43 decreases as the optical zoom magnification increases ($L_{X2}$ and $L_{Y2}$ decrease). Therefore, the coefficient $\alpha_2$ decreases. As a result, the distribution ratio of the electronic vibration-proof increases. Similarly, in a case where the movable range of the mechanical vibration-proof mechanism 43 is restricted by the change in the zoom position, $\theta_2$ in FIG. 10 decreases and the coefficient $\alpha_1$ also decreases.

Therefore, in a case where the main control unit 50 has table data in which the zoom position of the imaging lens 12 corresponds to $L_{X2}$, $L_{Y2}$, and $\theta_2$ which are the movable ranges of the mechanical vibration-proof mechanism 43, either the coefficient $\alpha_1$ or the coefficient $\alpha_2$ can be calculated.

Further, the angle of view D shown in FIG. 16 is changed in accordance with the electronic zoom magnification. As the electronic zoom magnification increases, the angle of view D decreases. As the angle of view D is smaller, the margin M (refer to FIG. 16) necessary for the electronic vibration-proof processing is larger. Therefore, the coefficients $\alpha_1$ and $\alpha_2$ can be increased.

Figure 20:
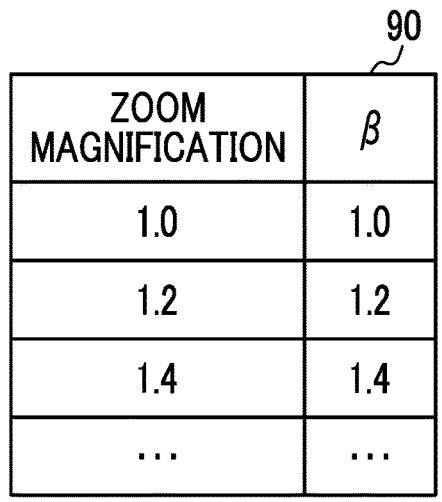
FIG. 20 is a diagram showing an example of a correction table in which a relationship between a zoom magnification and a correction coefficient is stored.

In the case of the present modification example, as shown in FIG. 20, the memory 45 may store the correction table 90 in which a relationship between the zoom magnification and a correction coefficient $\beta$ is stored. The main control unit 50 acquires, for example, the zoom magnification of the imaging lens 12 mounted on the body 11 from the lens data 35A (refer to FIG. 3) which is stored in the memory 35. The main control unit 50 may acquire the correction coefficient $\beta$ corresponding to the acquired zoom magnification from the correction table 90, and may set a value, which is obtained by multiplying the acquired correction coefficient $\beta$ by each of the coefficients $\alpha_1$ and $\alpha_2$, in the correction distribution processing unit 54.

The correction table 90 may record the focal length of the imaging lens 12 in association with the correction coefficient $\beta$ instead of the zoom magnification. Further, the identification (ID) of the imaging lens 12 included in the lens data 35A may be recorded in association with the correction coefficient $\beta$.

Further, in a case where the zoom operation for changing the zoom magnification of the imaging lens 12 is possible, the main control unit 50 may acquire the correction coefficient $\beta$ corresponding to the zoom magnification which is set by the zoom operation, from the correction table 90, and may correct the coefficients $\alpha_1$ and $\alpha_2$ on the basis of the acquired correction coefficient $\beta$.

Further, the memory 35 (refer to FIG. 3) of the imaging lens 12 may store the correction table 90. In such a case, it is necessary for only the correction coefficient $\beta$ corresponding to the zoom magnification of the imaging lens 12 to be recorded in the correction table 90. The main control unit 50 may acquire the correction coefficient $\beta$ from the correction table 90, which is stored in the memory 35, through the lens driving control unit 34. Further, in a case where the imaging lens 12 is mounted on the body 11, the main control unit 50 may acquire the correction table 90 from the memory 35 of the imaging lens 12, and may store the acquired correction table 90 in the memory 45 in the body 11. In addition, the current position in the lens barrel of the optical zoom lens included in the imaging lens 12 may be recorded in association with the correction coefficient β. Further, in a case where the body 11 is unable to communicate with the imaging lens 12 and is unable to read the information of the imaging lens 12, the correction coefficient β may correspond to the value of the focal length which is set by a user.

Fifth Modification Example

In the fifth modification example, the coefficients $\alpha_1$ and $\alpha_2$ are changed depending on whether or not the imaging lens 12 mounted on the body 11 has an optical shake correction function. In a case where the imaging lens 12 has the optical shake correction function, a part of the frequency components of the rotational shake and the translational shake is corrected by the optical shake correction function in the imaging lens 12. Therefore, it is possible to reduce, for example, the correction distribution ratio of the electronic vibration-proof processing.

In the case of the present modification example, the memory 45 may store a correction table in which a relationship between presence or absence of the optical shake correction function and the correction coefficient β is stored. The correction coefficient β may be determined on the basis of the separation frequency at which the rotational shake and the translational shake are separated into the low frequency component and the high frequency component by the optical shake correction function.

The main control unit 50 acquires, for example, information as to whether or not the imaging lens 12 mounted on the body 11 has the optical shake correction function, from the lens data 35A (refer to FIG. 3) which is stored in the memory 35. The main control unit 50 may acquire the correction coefficient β corresponding to the acquired information as to whether or not there is the optical shake correction function, from the correction table, and may set a value, which is obtained by multiplying the acquired correction coefficient β by each of the coefficients $\alpha_1$ and $\alpha_2$, in the correction distribution processing unit 54.

As in the case of the zoom magnification, the memory 35 (refer to FIG. 3) of the imaging lens 12 may store the correction table.

It should be noted that the memory 45 in the body 11 or the memory 35 of the imaging lens 12 may store the LUT for each case of presence or absence of the optical shake correction function without using the correction table.

Sixth Modification Example

In the sixth modification example, the coefficients $\alpha_1$ and $\alpha_2$ are changed between the angle-of-view priority mode and the electronic vibration-proof priority mode.

There is a trade-off relationship between the magnitude of the angle of view D (refer to FIG. 16) and performance of the electronic vibration-proof. That is, in a case where the angle of view D is increased, the region of the margin M necessary for the electronic vibration-proof is reduced, and the performance of the electronic vibration-proof is deteriorated. On the contrary, in a case where the margin M is increased in order to improve the performance of the electronic vibration-proof, the angle of view D is decreased.

The angle-of-view priority mode is a motion picture imaging mode in which a magnitude of the angle of view D is prioritized over the electronic vibration-proof. The electronic vibration-proof priority mode is a motion picture imaging mode in which the electronic vibration-proof is prioritized over the magnitude of the angle of view D. A user is able to select the angle-of-view priority mode or the electronic vibration-proof priority mode by operating the operating part 42.

In the present modification example, the memory 45 may store the correction table in which the relationship between the correction coefficient β and the selection information indicating which of the angle-of-view priority mode and the electronic vibration-proof priority mode is selected is stored. The correction coefficient β of the electronic vibration-proof priority mode may be made larger than the correction coefficient β of the angle-of-view priority mode.

The main control unit 50 may acquire the correction coefficient β corresponding to the selection information between the angle-of-view priority mode and the electronic vibration-proof priority mode from the correction table stored in the memory 45, and may set a value, which is obtained by multiplying the acquired correction coefficients β by each of the coefficients $\alpha_1$ and $\alpha_2$, in the correction distribution processing unit 54.

It should be noted that the memory 45 may store the LUT for each of the angle-of-view priority mode and the electronic vibration-proof priority mode without using the correction table.

Seventh Modification Example

In the seventh modification example, in a case where the switching to the second mode is performed in which the frame rate FR is higher than that in the first mode during the motion picture imaging in the first mode, the coefficient $\alpha_1$ is set to 0. For example, the first mode is a motion picture imaging mode with FR=60 fps. The second mode is a motion picture imaging mode with FR=240 fps.

Figure 21:
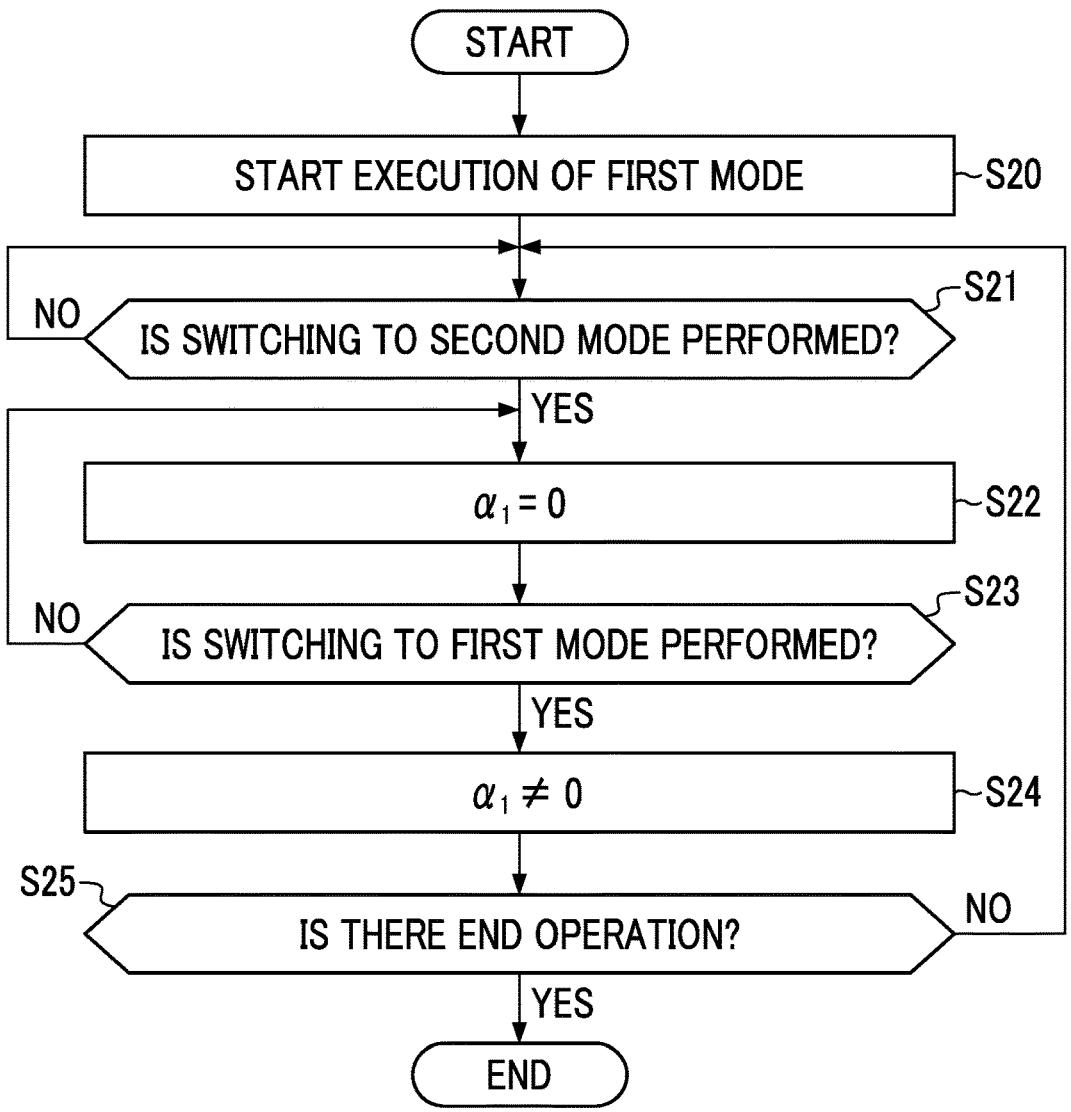
FIG. 21 is a flowchart showing processing of a main control unit according to a seventh modification example.

In the present modification example, the main control unit 50 performs, for example, the processing which is shown in the flowchart shown in FIG. 21. The main control unit 50 starts the imaging operation in the first mode in accordance with the operation of the operating part 42 (step S20). In such a case, the coefficients $\alpha_1$ and $\alpha_2$ are set to values corresponding to the frame rate FR of the first mode.

Next, the main control unit 50 determines whether or not the mode is switched from the first mode to the second mode through the operation of the operating part 42 (step S21). In a case where the main control unit 50 determines that switching to the second mode is performed (step S21: YES), the main control unit 50 sets the coefficient $\alpha_1$ to 0 (step S22). As a result, the correction distribution ratio for the rotational shake of the electronic vibration-proof processing is set to 0.

Next, the main control unit 50 determines whether or not the mode is switched from the second mode to the first mode through the operation of the operating part 42 (step S23). In a case where the main control unit 50 determines that the mode is not switched to the first mode (step S23: NO), the main control unit 50 returns the processing to step S22. In a case where the main control unit 50 determines that switching to the first mode is performed (step S23: YES), the main control unit 50 sets the coefficient $\alpha_1$ to a value ($\alpha_1 \neq 0$) corresponding to the frame rate FR of the first mode (step S24).

Next, the main control unit 50 determines whether or not there is an end operation for ending the motion picture imaging through the operation of the operating part 42 (step S25). In a case where the main control unit 50 determines that there is no end operation (step S25: NO), the main control unit 50 returns the processing to step S21. In a case where it is determined that the end operation is performed (step S25: YES), the main control unit 50 ends the processing.

In such a manner, in a case where the image is recorded at a high frame rate only for a specific period on the basis of an instruction of a user, the correction distribution ratio for the rotational shake of the electronic vibration-proof processing is set to 0 for the period. Thus, it is possible to avoid a processing failure due to incompletion of the correction of the rotational shake within one frame period.

In a case where the mode is switched from the first mode to the second mode, not only the coefficient $\alpha_1$ but also the coefficient $\alpha_2$ may be set to 0, and the correction distribution ratio for the rotational shake and the translational shake of the electronic vibration-proof processing may be set to 0.

Eighth Modification Example

In the eighth modification example, the correction distribution ratio during the live view imaging before the motion picture imaging is determined on the basis of not the frame rate in the live view imaging but the frame rate of the motion picture imaging mode executed after the live view imaging. The live view imaging is an imaging mode in which the above-mentioned live view image is acquired, and no image data is recorded.

Figure 22:
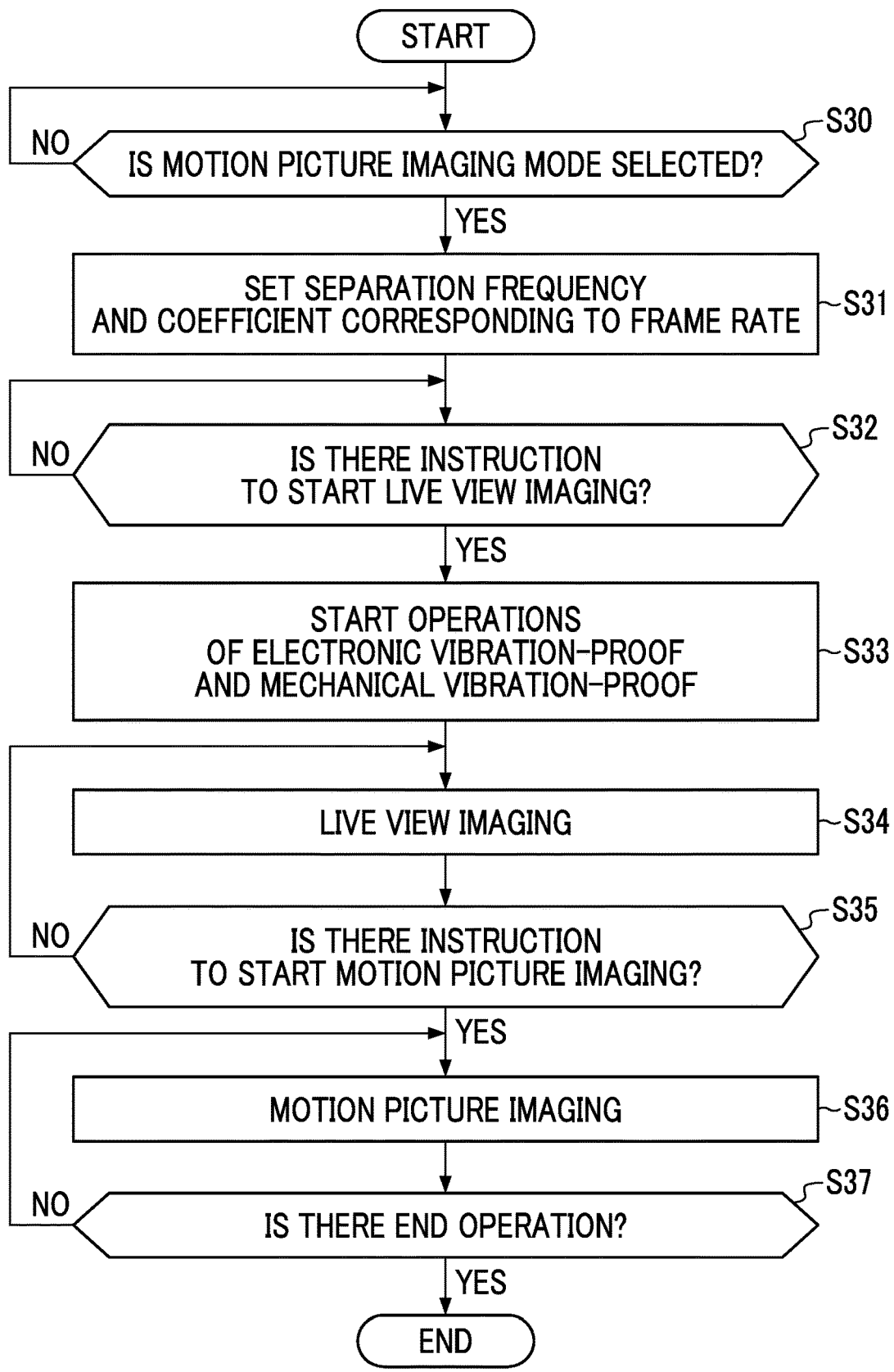
FIG. 22 is a flowchart showing processing of a main control unit according to an eighth modification example.

In the present modification example, the main control unit 50 performs, for example, the processing shown in the flowchart shown in FIG. 22. The main control unit 50 determines whether or not the motion picture imaging mode is selected through the operation of the operating part 42 (step S30). In a case where the main control unit 50 determines that the motion picture imaging mode is selected (step S30: YES), the main control unit 50 sets the coefficients $\alpha_1$ and $\alpha_2$ and the separation frequencies $f_{c1}$ and $f_{c2}$ corresponding to the frame rate FR of the selected motion picture imaging mode in the correction distribution processing unit 54 (step S31). The details of the setting processing of step S31 are the same as those of steps S10 to S13 shown in FIG. 15.

Next, the main control unit 50 determines whether or not there is an instruction to start the live view imaging through the operation of the operating part 42 (step S32). In a case where the main control unit 50 determines that the start instruction of the live view imaging is issued (step S32: YES), the main control unit 50 starts the electronic vibration-proof and mechanical vibration-proof operations (step S33). In the electronic vibration-proof processing and the mechanical vibration-proof processing, the correction processing is executed at the correction distribution ratio on the basis of the coefficients $\alpha_1$ and $\alpha_2$ set in step S31. Then, the main control unit 50 starts the electronic vibration-proof and mechanical vibration-proof operations and starts the live view imaging (step S34). The image which is acquired by the live view imaging is displayed in real time on the display 15 or the finder 17 (refer to FIG. 3).

Next, the main control unit 50 determines whether or not there is an instruction to start the motion picture imaging through the operation of the operating part 42 (step S35). In a case where the main control unit 50 determines that there is no instruction to start the motion picture imaging (step S35: NO), the main control unit 50 returns the processing to step S34 to continue the live view imaging. In a case where the main control unit 50 determines that the instruction to start the motion picture imaging is issued (step S35: YES), the main control unit 50 starts the motion picture imaging (step S36). Even during this motion picture imaging, the electronic vibration-proof and mechanical vibration-proof operations started in step S33 are continuously performed.

Next, the main control unit 50 determines whether or not there is an end operation for terminating the motion picture imaging through the operation of the operating part 42 (step S37). In a case where the main control unit 50 determines that there is no end operation (step S37: NO), the main control unit 50 returns the processing to step S36 to continue the motion picture imaging. In a case where it is determined that the end operation is performed (step S37: YES), the main control unit 50 ends the processing.

As described above, in the present modification example, even in a case where the frame rates differ between the live view imaging and the motion picture imaging, the correction distribution ratio during the live view imaging is determined on the basis of the frame rate of the motion picture imaging mode executed after the live view imaging. Therefore, since the effect of the shake correction is the same between the time of the live view imaging and the motion picture imaging, the motion picture is captured by the effect of the shake correction confirmed by a user during the live view imaging. Thereby, the motion picture intended by the user can be obtained.

Ninth Modification Example

In the ninth modification example, the third mode of generating the motion picture of the first frame rate FR1 can be executed by synthesizing a plurality of frames imaged at the second frame rate FR2. Here, it is assumed that FR2>FR1 and, for example, FR1=60 fps and FR2=240 fps. The frame refers to the image data obtained in one frame period.

Figure 23:
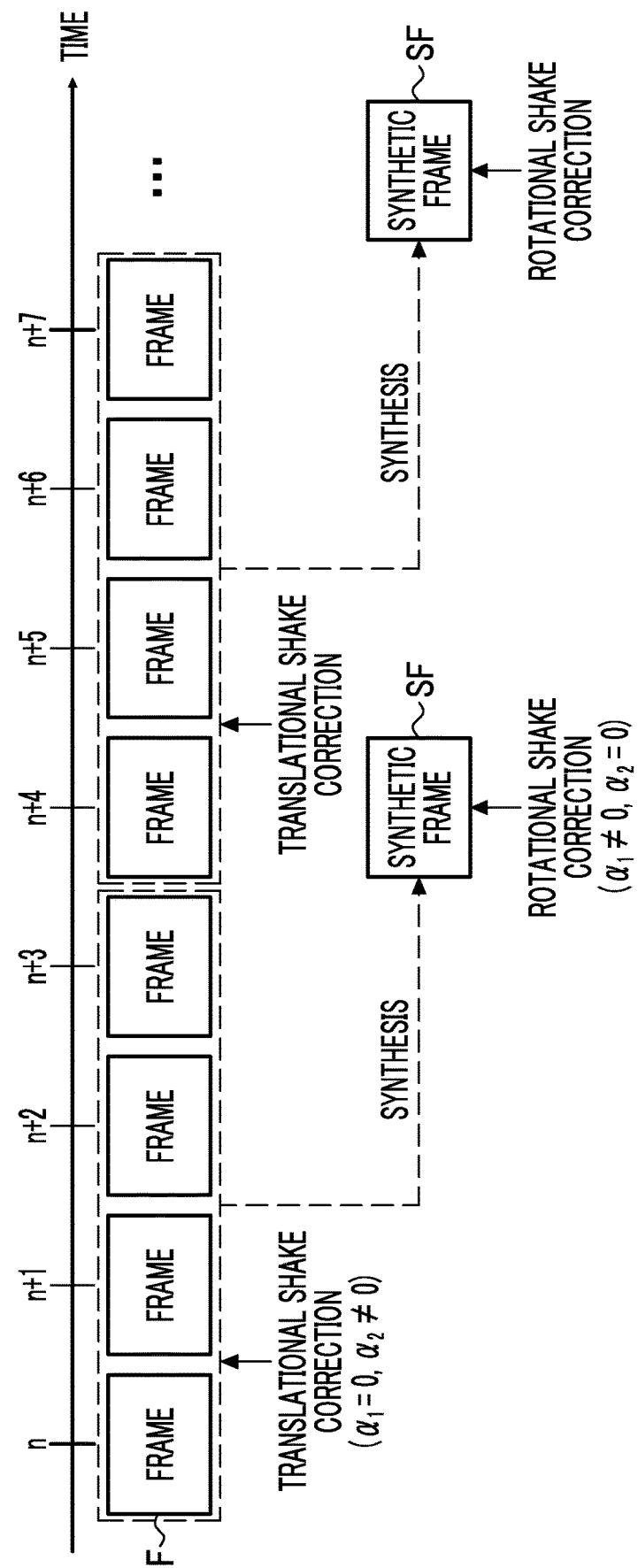
FIG. 23 is a diagram showing a third mode according to a ninth modification example.

FIG. 23 is a diagram showing the third mode. In the third mode shown in FIG. 23, the image processing unit 41 generates a frame F at the second frame rate FR2. Each time the image processing unit 41 generates the four frames F, the image processing unit 41 synthesizes the generated four frames F to generate one synthetic frame SF. Therefore, the synthetic frame SF is generated at the first frame rate FR1.

In the present modification example, translational shake correction is performed for each of the plurality of frames F generated at the second frame rate FR2, and rotational shake correction is performed for the synthetic frame SF generated at the first frame rate FR1. Specifically, the main control unit 50 sets the correction distribution ratio for the rotational shake of the electronic vibration-proof processing to 0 by setting the coefficient $\alpha_1$, which is set in the first distribution processing unit 54A (refer to FIG. 5), to 0 in a case where the frame F is corrected by the electronic vibration-proof. Further, the main control unit 50 sets the correction distribution ratio for the translational shake of the electronic vibration-proof processing to 0 by setting the coefficient $\alpha_2$, which is set in the second distribution processing unit 54B (refer to FIGS. 7A and 7B), to 0 in a case where the synthetic frame SF is corrected by the electronic vibration-proof.

Further, it is preferable that the separation frequency $f_{c2}$ (refer to FIGS. 7A and 7B) in a case of correcting the translational shake of the frame F and the separation frequency $f_{c1}$ (refer to FIG. 5) in a case of correcting the rotational shake of the synthetic frame SF are different from each other. For example, the separation frequency $f_{c2}$ is set on the basis of the first frame rate FR1, and the separation frequency $f_{c1}$ is set on the basis of the second frame rate FR2.

As described above, in the present modification example, the correction of the rotational shake with a large calculation load is performed only for the synthetic frame SF generated at the low frame rate. Therefore, it is possible to appropriately perform the electronic vibration-proof even in a case where the frame rate for acquiring the frame F is high.

Tenth Modification Example

Figure 24:
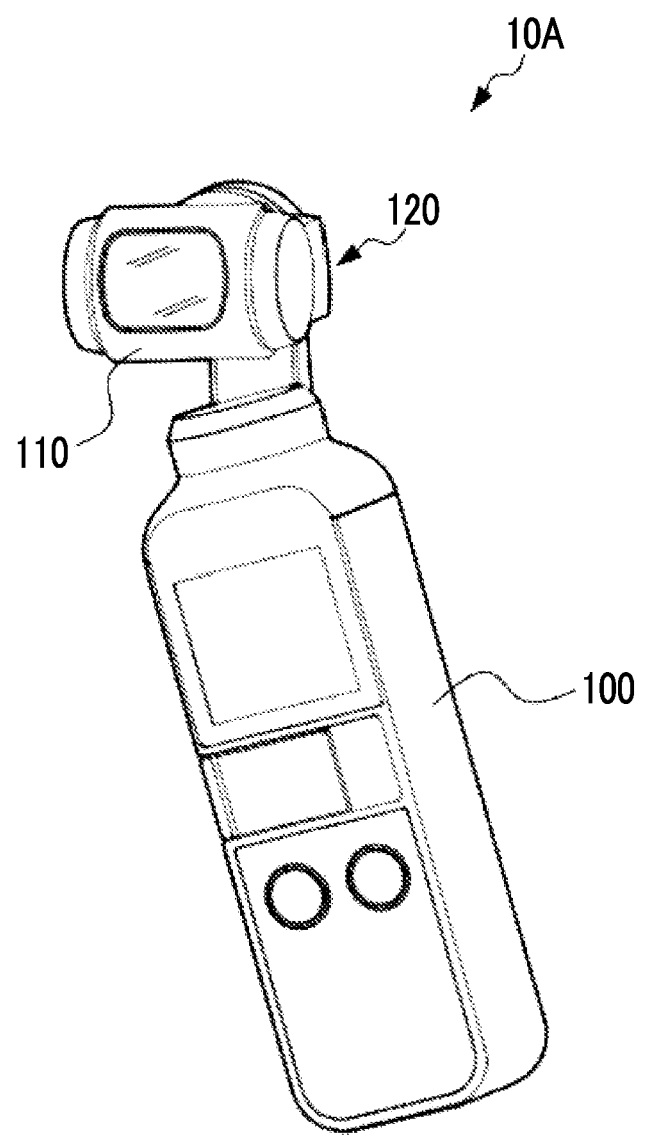
FIG. 24 is a diagram showing an imaging apparatus according to a tenth modification example.

The mechanical vibration-proof mechanism 43 is not limited to the so-called sensor shift system in which the imaging sensor 20 shown in FIG. 10 is translated and rotated by a coil and a yoke. For example, the mechanical vibration-proof mechanism 43 may be a gimbal mechanism 120 provided in the imaging apparatus 10A shown in FIG. 24. The gimbal mechanism 120 is provided between a body 100 and a camera unit 110 in which the imaging sensor is built. The gimbal mechanism 120 is a stabilizer that rotatably holds the camera unit 110 around three axes, and controls the camera unit 110 to maintain a constant posture.

The first embodiment and the various modification examples can be combined with each other as long as no contradiction occurs.

In the above-mentioned embodiments, various processors shown below can be used as the hardware structure of the control unit using the processor 40 as an example. The various processors include, in addition to the CPU, which is a general-purpose processor that functions by executing software (program), a processor such as an FPGA of which the circuit configuration can be changed after manufacturing. The FPGA includes a dedicated electric circuit, which is a processor having a circuit configuration specially designed for executing a specific processing, such as PLD or ASIC.

The control unit may be configured as one of the various processors, or may be configured as a combination of two or more of the same or different kinds of processors (for example, a combination of a plurality of FPGAs or a combination of a CPU and an FPGA). Further, the plurality of control units may be constituted of one processor.

A plurality of examples in which a plurality of control units are configured as one processor can be considered. In the first example, as represented by computers such as a client and a server, there is a form in which one processor is constituted of a combination of one or more CPUs and software and this processor functions as a plurality of control units. As a second example, as typified by system on chip (SOC), there is a form in which a processor that implements the functions of the whole system which includes a plurality of control units with one IC chip is used. As described above, the control unit can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. Further, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
an imaging sensor;
a detection sensor that detects rotational shake, which is delivered to a body that accommodates the imaging sensor, in a roll direction;
a mechanical vibration-proof mechanism that corrects the rotational shake by rotatably holding the imaging sensor in the roll direction and rotating the imaging sensor; and
a processor,
wherein the processor is configured to execute:
mechanical vibration-proof processing using the mechanical vibration-proof mechanism;
electronic vibration-proof processing of correcting the rotational shake;
driving processing of driving the imaging sensor in one mode selected from a plurality of modes including a first mode in which a motion picture is captured at a first frame rate and a second mode in which a motion picture is captured at a second frame rate different from the first frame rate; and
correction distribution processing of distributing correction of a part of the rotational shake to the mechanical vibration-proof processing and correction of a part of the rotational shake to the electronic vibration-proof processing, and
in the correction distribution processing, the processor causes a correction distribution ratio between the mechanical vibration-proof processing and the electronic vibration-proof processing to be different in the first mode and the second mode.

2. The imaging apparatus according to claim 1,
wherein the second frame rate is higher than the first frame rate, and
in the correction distribution processing, the processor causes a correction distribution ratio of the electronic vibration-proof processing in the second mode to be smaller than a correction distribution ratio of the electronic vibration-proof processing in the first mode.

3. The imaging apparatus according to claim 2,
wherein the processor sets the correction distribution ratio of the electronic vibration-proof processing in the second mode to 0.

4. The imaging apparatus according to claim 1,
wherein the processor is configured to:
separate the rotational shake into a first frequency component and a second frequency component having a frequency higher than a frequency of the first frequency component;
distribute correction of a first component, which is obtained by multiplying the first frequency component by a coefficient α (0<α<1) corresponding to the correction distribution ratio of the electronic vibration-proof processing, by the electronic vibration-proof processing, in the first mode; and distribute a second component, which is obtained by adding a component obtained by multiplying the first frequency component by (1−α) to the second frequency component, by the mechanical vibration-proof processing.

5. The imaging apparatus according to claim 4,
wherein the processor is configured to:
determine the correction distribution ratio by acquiring the coefficient α, which corresponds to a frame rate in the mode in which the imaging sensor is driven, with reference to a look-up table in which a relationship between the frame rate and the coefficient α is recorded.

6. The imaging apparatus according to claim 4,
wherein the coefficient α is different depending on a resolution of an image signal.

7. The imaging apparatus according to claim 4,
wherein a lens is mountable on the body, and
the coefficient α is different depending on presence or absence of an optical shake correction function of the lens mounted on the body or a zoom magnification.

8. The imaging apparatus according to claim 1,
wherein the processor is configured to:
change a recording region, which is selected from an inside of an imaging region of the imaging sensor between a plurality of frames, in the electronic vibration-proof processing; and
cause the recording region in the second mode to be larger than the recording region in the first mode.

9. The imaging apparatus according to claim 1,
wherein the mechanical vibration-proof mechanism holds the imaging sensor such that the imaging sensor is translatable in an intersection direction intersecting a rotation axis in the roll direction,
the detection sensor detects translational shake, which is delivered to the body, in the intersection direction, and
the processor is configured to:
correct the rotational shake and the translational shake by rotating and translating the imaging sensor, in the mechanical vibration-proof processing;
correct the rotational shake and the translational shake, in the electronic vibration-proof processing; and
distribute correction of a part of the rotational shake to the mechanical vibration-proof processing and distribute correction of a part of the rotational shake to the electronic vibration-proof processing, and distribute correction of a part of the translational shake to the mechanical vibration-proof processing and distribute correction of a part of the translational shake to the electronic vibration-proof processing, in the correction distribution processing.

10. The imaging apparatus according to claim 9,
wherein the detection sensor detects at least one angular shake around an axis intersecting the rotation axis in addition to the rotational shake and the translational shake, and
in the correction distribution processing, in a case where a shake obtained by adding the angular shake to the translational shake is set as a total shake, the processor distributes correction of a part of the total shake to the mechanical vibration-proof processing and distributes correction of a part of the total shake to the electronic vibration-proof processing.

11. The imaging apparatus according to claim 10,
wherein the processor is configured to:
execute a third mode in which the motion picture of the first frame rate is generated by synthesizing a plurality of frames imaged at the second frame rate, in the driving processing; and
correct the translational shake for the plurality of frames imaged at the second frame rate and correct the rotational shake for a synthetic frame in which the plurality of frames are synthesized, in the electronic vibration-proof processing.

12. The imaging apparatus according to claim 9,
wherein in the first mode or the second mode, the correction distribution ratio of the translational shake is different from the correction distribution ratio of the rotational shake.

13. The imaging apparatus according to claim 1,
wherein the processor is configured to:
switch to the second mode on the basis of an instruction from a user during motion picture imaging in the first mode, in the driving processing; and
set the correction distribution ratio for the rotational shake of the electronic vibration-proof processing to 0 in a case where the switching to the second mode is performed, in the correction distribution processing.

14. The imaging apparatus according to claim 1,
wherein in the correction distribution processing, the processor determines the correction distribution ratio in live view imaging before motion picture imaging on the basis of a frame rate of the mode executed after the live view imaging.

15. An operation method of an imaging apparatus including
an imaging sensor,
a detection sensor that detects rotational shake, which is delivered to a body that accommodates the imaging sensor, in a roll direction, and
a mechanical vibration-proof mechanism that corrects the rotational shake by rotatably holding the imaging sensor in the roll direction and rotating the imaging sensor,
the operation method of the imaging apparatus comprising executing:
mechanical vibration-proof processing using the mechanical vibration-proof mechanism;
electronic vibration-proof processing of correcting the rotational shake;
driving processing of driving the imaging sensor in one mode selected from a plurality of modes including a first mode in which a motion picture is captured at a first frame rate and a second mode in which a motion picture is captured at a second frame rate higher than the first frame rate; and
correction distribution processing of distributing correction of a part of the rotational shake to the mechanical vibration-proof processing and distributing correction of a part of the rotational shake to the electronic vibration-proof processing, and correction distribution processing of causing a correction distribution ratio between the mechanical vibration-proof processing and the electronic vibration-proof processing to be different in the first mode and the second mode.

* * * * *